(12) United States Patent
Assanis et al.

(10) Patent No.: US 10,066,580 B2
(45) Date of Patent: Sep. 4, 2018

(54) LEAN BURN INTERNAL COMBUSTION ENGINE

(71) Applicants: THE REGENTS OF THE UNIVERSITY OF MICHIGAN, Ann Arbor, MI (US); HYUNDAI AMERICA TECHNICAL CENTER, INC., Superior Township, MI (US)

(72) Inventors: Dimitris Assanis, Ann Arbor, MI (US); Margaret S. Wooldridge, Saline, MI (US); Paul Neuman, St. Joseph, MI (US); Nayan Engineer, Canton, MI (US)

(73) Assignees: The Regents of The University of Michigan, Ann Arbor, MI (US); HYUNDAI AMERICA TECHNICAL CENTER, INC., Superior Township, MI (US)

( * ) Notice: Subject to any disclaimer, the term of this patent is extended or adjusted under 35 U.S.C. 154(b) by 0 days.

(21) Appl. No.: 15/292,490

(22) Filed: Oct. 13, 2016

(65) Prior Publication Data
US 2017/0107938 A1 Apr. 20, 2017

Related U.S. Application Data

(60) Provisional application No. 62/241,829, filed on Oct. 15, 2015.

(51) Int. Cl.
*F02B 19/00* (2006.01)
*F02F 3/28* (2006.01)
*F02B 19/12* (2006.01)
*F02B 19/16* (2006.01)
*F02B 23/08* (2006.01)

(52) U.S. Cl.
CPC ............... *F02F 3/28* (2013.01); *F02B 19/12* (2013.01); *F02B 19/16* (2013.01); *F02B 23/08* (2013.01)

(58) Field of Classification Search
CPC .. F02B 1/04; F02B 19/12; F02B 19/00; F02B 19/1095; F02F 3/28; F02F 3/285
USPC ......... 123/253, 256, 26, 266, 268, 269, 273, 123/275, 286
See application file for complete search history.

(56) References Cited

U.S. PATENT DOCUMENTS 2,866,839 A * 12/1958 Kaehni ................... F02P 15/10
                                                         123/143 A
3,230,939 A *  1/1966 Goossak ............. F02B 19/1004
                                                         123/258

(Continued)

*Primary Examiner* — Thomas Moulis
(74) *Attorney, Agent, or Firm* — Harness, Dickey & Pierce, P.L.C.

(57) ABSTRACT

An internal combustion engine having a fuel injector, a piston chamber, a piston slidably disposed in the piston chamber having a piston crown along a top surface, a head assembly having at least one pre-chamber separate from the piston chamber and in fluid communication with the piston chamber via at least one connecting orifice, and an ignition device disposed in the pre-chamber for igniting a fuel air mixture within the pre-chamber, thereby producing an ignition jet being introduced into the piston chamber via the at least one connecting orifice to ignite a fuel/air mixture in the piston chamber. The fuel/air mixture is passively introduced into the at least one pre-chamber during at least a compression stroke of the piston.

18 Claims, 15 Drawing Sheets

(56) References Cited

U.S. PATENT DOCUMENTS

| | | | | |
|---|---|---|---|---|
| 3,443,552 A * | 5/1969 | Von Seggern | F02B 19/10 | 123/262 |
| 3,776,212 A * | 12/1973 | Karlowitz | F02B 19/08 | 123/259 |
| 3,871,351 A * | 3/1975 | Geiger | F02B 19/1042 | 123/258 |
| 3,973,530 A * | 8/1976 | Seidel | F02B 19/02 | 123/256 |
| 4,023,541 A * | 5/1977 | Sakamoto | F02B 19/08 | 123/193.4 |
| 4,041,922 A * | 8/1977 | Abe | F02B 19/12 | 123/143 B |
| 4,096,844 A * | 6/1978 | Mackaness | F02B 19/06 | 123/193.6 |
| 4,124,003 A * | 11/1978 | Abe | F02B 17/00 | 123/169 EL |
| 4,127,095 A * | 11/1978 | Noguchi | F02B 19/12 | 123/266 |
| 4,144,848 A * | 3/1979 | Hatanaka | F02B 19/10 | 123/293 |
| 4,218,992 A * | 8/1980 | Latsch | F02B 19/08 | 123/260 |
| 4,236,490 A * | 12/1980 | Correll | F02B 19/04 | 123/193.4 |
| 4,351,294 A * | 9/1982 | Giddings | F02B 23/00 | 123/260 |
| 4,487,177 A * | 12/1984 | Ishikawa | H01T 13/467 | 123/143 B |
| 4,518,268 A * | 5/1985 | Swis | F02B 77/083 | 374/144 |
| 4,572,123 A * | 2/1986 | Evans | F02B 19/14 | 123/193.6 |
| 4,594,976 A * | 6/1986 | Gonzalez | F02B 11/02 | 123/260 |
| 4,785,776 A * | 11/1988 | Tokura | F02B 23/0639 | 123/262 |
| 4,881,501 A * | 11/1989 | Shinzawa | F02B 19/02 | 123/193.6 |
| 4,924,829 A * | 5/1990 | Cheng | F02B 19/1004 | 123/169 PA |
| 5,050,550 A * | 9/1991 | Gao | F02B 11/00 | 123/275 |
| 5,421,300 A * | 6/1995 | Durling | F02B 19/12 | 123/266 |
| 5,709,189 A * | 1/1998 | Monnier | F02B 19/12 | 123/260 |
| 5,799,637 A * | 9/1998 | Cifuni | H01T 13/54 | 123/169 PA |
| 6,065,441 A * | 5/2000 | Regueiro | F02B 19/18 | 123/269 |
| 6,095,112 A * | 8/2000 | Glauber | F02B 19/12 | 123/256 |
| 7,353,797 B1 * | 4/2008 | Breidenthal | F02B 19/04 | 123/263 |
| 8,839,762 B1 * | 9/2014 | Chiera | F02B 19/108 | 123/256 |
| 9,653,886 B2 * | 5/2017 | Chiera | H01T 13/06 | |
| 9,670,827 B2 * | 6/2017 | Taliaferro | F02B 19/1009 | |
| 9,745,892 B2 * | 8/2017 | Sotiropoulou | F02B 19/18 | |
| 2003/0213461 A1 * | 11/2003 | Regueiro | F02B 19/08 | 123/262 |
| 2004/0084001 A1 * | 5/2004 | Lipski | H01T 13/462 | 123/169 EL |
| 2005/0000484 A1 * | 1/2005 | Schultz | F02B 19/12 | 123/266 |
| 2005/0072400 A1 * | 4/2005 | Kojic | F02B 1/12 | 123/256 |
| 2005/0092285 A1 * | 5/2005 | Klonis | F02B 19/12 | 123/266 |
| 2006/0096571 A1 * | 5/2006 | Tourteaux | F02B 17/005 | 123/266 |
| 2006/0130804 A1 * | 6/2006 | Teraji | F02B 19/12 | 123/256 |
| 2007/0069617 A1 * | 3/2007 | Tozzi | F02B 19/08 | 313/140 |
| 2007/0236122 A1 * | 10/2007 | Borror | H01T 13/54 | 313/118 |
| 2009/0133667 A1 * | 5/2009 | Inoue | F02B 19/12 | 123/260 |
| 2010/0326400 A1 * | 12/2010 | Hayes, Jr. | F02B 19/108 | 123/279 |
| 2011/0065350 A1 * | 3/2011 | Burke | H01T 13/54 | 445/46 |
| 2011/0146618 A1 * | 6/2011 | LaPointe | F02B 19/12 | 123/266 |
| 2011/0297121 A1 * | 12/2011 | Kraus | F02B 19/1023 | 123/260 |
| 2011/0308489 A1 * | 12/2011 | Herden | F02B 19/12 | 123/143 B |
| 2013/0055986 A1 * | 3/2013 | Tozzi | F02B 19/12 | 123/254 |
| 2013/0099653 A1 * | 4/2013 | Ernst | H01T 13/32 | 313/140 |
| 2013/0139784 A1 * | 6/2013 | Pierz | F02B 19/1009 | 123/254 |
| 2013/0206122 A1 * | 8/2013 | Chiera | H01T 13/54 | 123/594 |
| 2014/0060479 A1 * | 3/2014 | Tozzi | F02B 19/108 | 123/260 |
| 2014/0076274 A1 * | 3/2014 | Tozzi | F02P 9/002 | 123/260 |
| 2014/0102404 A1 * | 4/2014 | Sotiropoulou | F02B 19/1014 | 123/260 |
| 2014/0130761 A1 * | 5/2014 | Woerner | F02P 23/04 | 123/143 B |
| 2014/0209057 A1 * | 7/2014 | Pouring | F02B 19/12 | 123/257 |
| 2014/0261296 A1 * | 9/2014 | Sotiropoulou | F02B 19/12 | 123/260 |
| 2014/0360468 A1 * | 12/2014 | Fedin | F02B 19/12 | 123/445 |
| 2015/0020766 A1 * | 1/2015 | LaPointe | F02B 19/16 | 123/285 |
| 2015/0040845 A1 * | 2/2015 | Chiera | F02B 19/108 | 123/41.32 |
| 2016/0032844 A1 * | 2/2016 | Siuchta | F02D 15/04 | 123/48 AA |
| 2016/0053670 A1 * | 2/2016 | Tozzi | F02B 19/08 | 123/260 |
| 2016/0053671 A1 * | 2/2016 | Sotiropoulou | F02B 19/12 | 123/260 |
| 2016/0053673 A1 * | 2/2016 | Sotiropoulou | F02B 19/18 | 123/260 |
| 2016/0273443 A1 * | 9/2016 | Chiera | F02B 19/18 | |
| 2016/0326946 A1 * | 11/2016 | Willi | F02B 19/08 | |
| 2017/0096932 A1 * | 4/2017 | Chiera | F02B 19/18 | |
| 2017/0101923 A1 * | 4/2017 | Loetz | F02B 19/18 | |
| 2017/0122184 A1 * | 5/2017 | Hampson | F02B 19/1085 | |
| 2017/0145900 A1 * | 5/2017 | Singh | F02B 19/18 | |

* cited by examiner

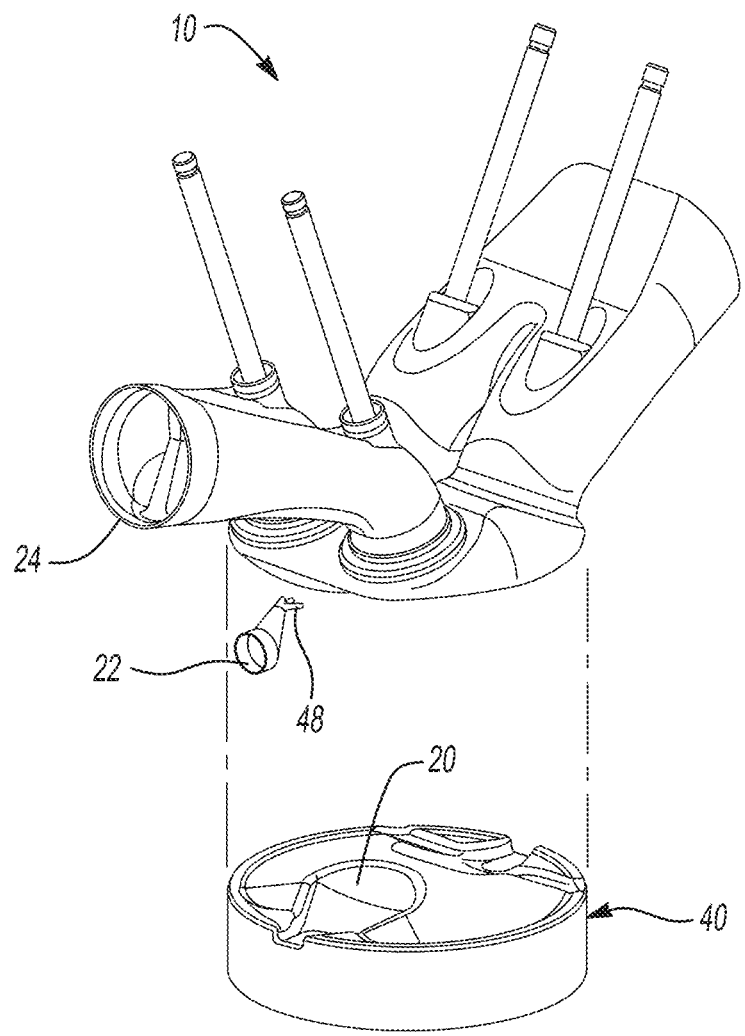
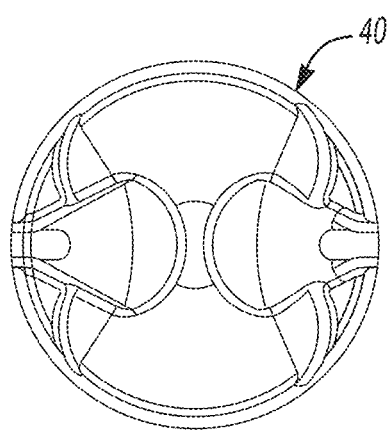

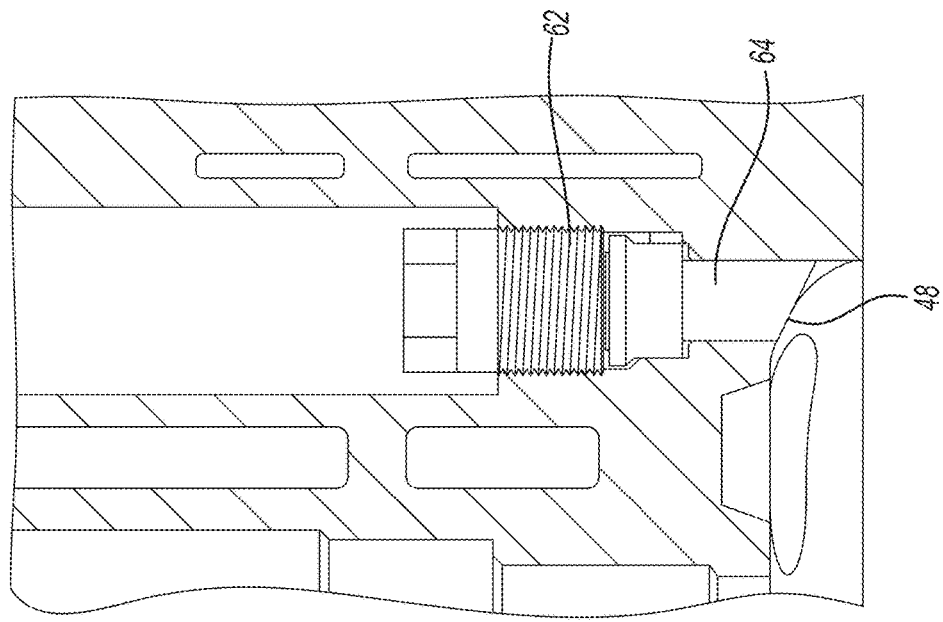
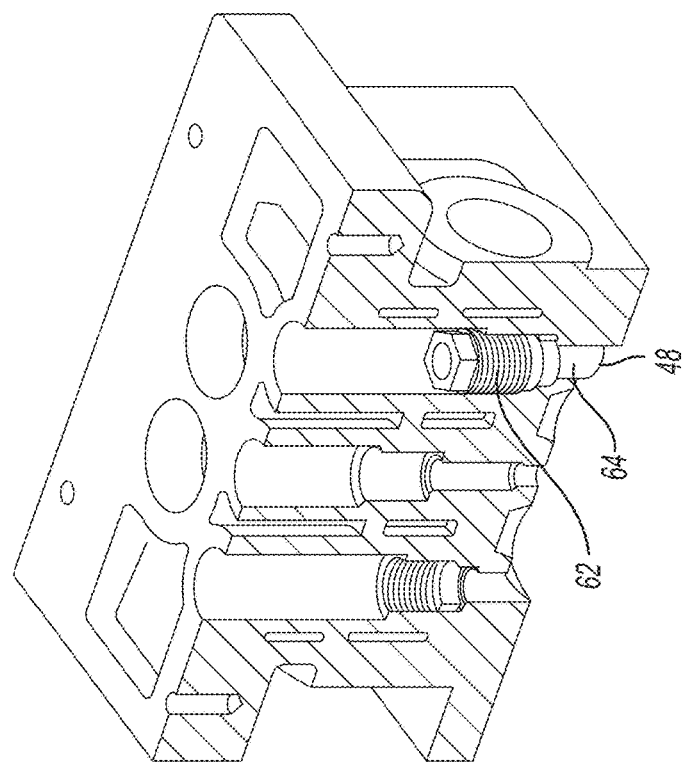
Fig-9B
Fig-9A

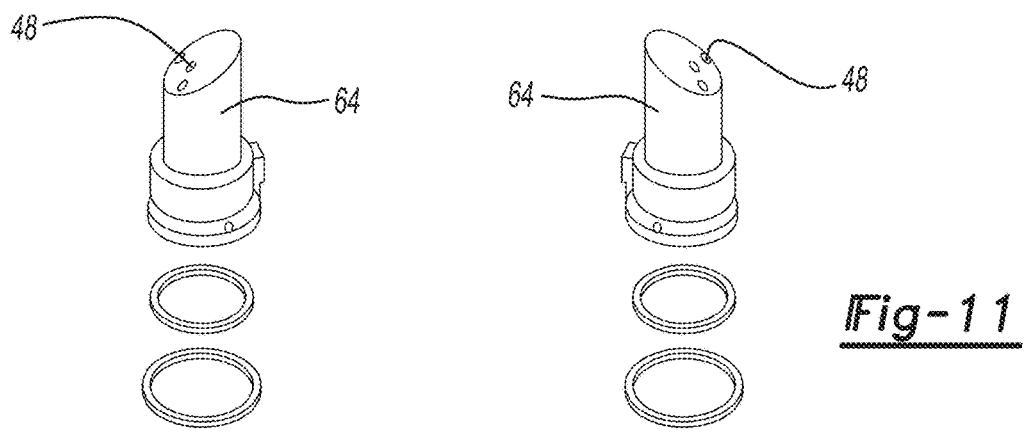
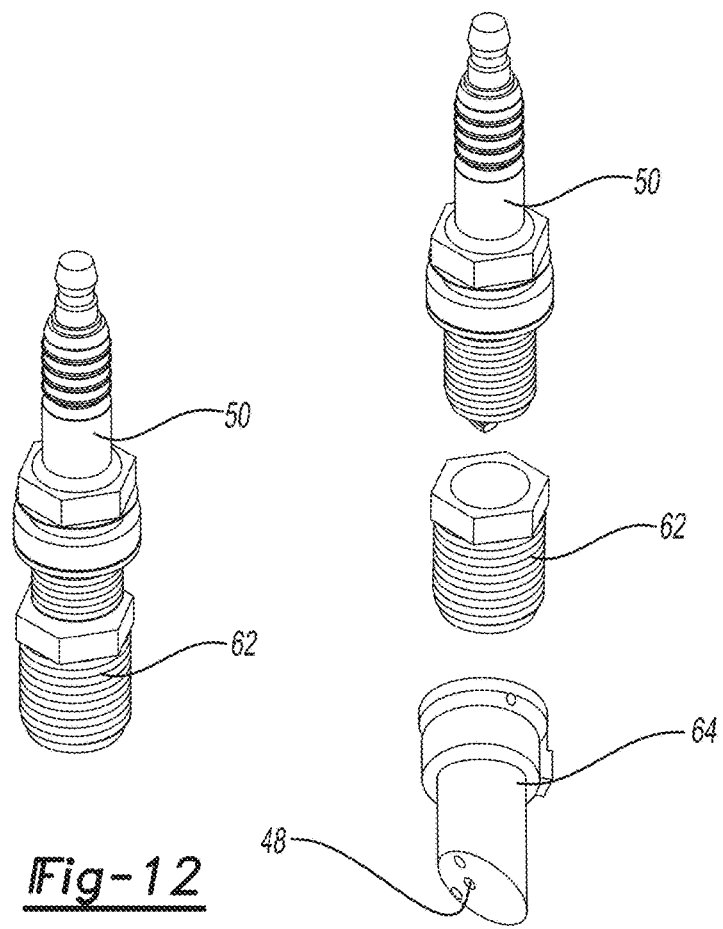
Fig-11
Fig-12

LEAN BURN INTERNAL COMBUSTION ENGINE

CROSS-REFERENCE TO RELATED APPLICATIONS

This application claims the benefit of U.S. Provisional Application No. 62/241,829, filed on Oct. 15, 2015. The entire disclosure of the above application is incorporated herein by reference.

FIELD

The present disclosure relates to internal combustion engines and, more particularly, relates to internal combustion engines having a pre-chamber fluidly coupled to a main combustion chamber.

BACKGROUND AND SUMMARY

This section provides background information related to the present disclosure which is not necessarily prior art. This section provides a general summary of the disclosure, and is not a comprehensive disclosure of its full scope or all of its features.

Lean burn combustion strategies are an attractive option to increase the thermal efficiency of gasoline spark ignition internal combustion engines, but engine design remains challenging due to the flammability limits of the fuel/air mixture. Turbulent jet ignition originating from a combustion pre-chamber can help address mixture flammability limits by ejecting high enthalpy and highly reactive jets into the main combustion chamber, thereby enhancing the combustion in the main chamber. However, appropriate mixture conditions must be achieved in the pre-chambers for this strategy to be successful. Pre-chambers have been studied extensively in the past, specifically related to compression ignition engines, as a capable technology to improve in-cylinder combustion robustness. Past learnings of traditional pre-chamber technologies related to heat transfer losses and mixture stratification have specifically guided the sizing, shape, orientation, and number of pre-chambers. The engine design developed in this work proposes a new approach to pre-chamber design that is enabled by advancements in numerical simulations, computational resources, fuel injection hardware, and manufacturing techniques. Specifically, the design considers a combustion system where fuel is injected into the main chamber and a fuel/air mixture is passively introduced into an adjacent pre-chamber connected to the main chamber whereby spark electrodes located in the pre-chambers are capable of igniting the localized mixture within the pre-chamber.

In some embodiments, pre-chambers are a means to enable lean burn combustion strategies which can increase the thermal efficiency of gasoline spark ignition internal combustion engines. A new engine concept is evaluated in this work using computational simulations of non-reacting flow. The objective of the computational study was to evaluate the feasibility of several engine design configurations combined with fuel injection strategies to create local fuel/air mixtures in the pre-chambers above the ignition and flammability limits, while maintaining lean conditions in the main combustion chamber. The current work used computational fluid dynamics to develop a novel combustion chamber geometry where the flow was evaluated through a series of six design iterations to create ignitable mixtures (based on fuel-to-air equivalence ratio, $\phi$) using fuel injection profiles and flow control via the piston, cylinder head, and pre-chamber geometry. The desirable and undesirable features that guided the design progression are presented. Major combustion chamber design iterations involved changes to the pre-chambers position relative to the cylinder head deck plane, azimuthal orientation of the pre-chambers, and piston crown geometry. Further criteria were developed to assess the flow interaction with the nozzle connections to the pre-chambers. The modeling results indicated appropriate fueling strategies achieved near stoichiometric fuel-to-air equivalence ratios in the pre-chambers with lean fuel-to-air equivalence ratios in the main chamber. The results also demonstrated the utility of the flow-alignment and chamber filling criteria to select the nozzle design for the pre-chambers.

Lean burn combustion strategies are an attractive option to increase the thermal efficiency of gasoline spark ignition internal combustion engines, but engine design remains challenging due to the lean flammability limits of the fuel/air mixture. Lean after treatment strategies can be a concern; however, recent advances show considerable promise for effective emissions control for lean burn gasoline direct injection engines. Turbulent jet ignition originating from a combustion pre-chamber can help address mixture flammability limits by ejecting high enthalpy and highly reactive jets into the main chamber, enabling lean combustion in the main chamber. However, appropriate mixture conditions must be achieved in the pre-chamber for this strategy to be successful.

Pre-chambers have been studied extensively in the past, in particular for application in compression ignition engines, and pre-chambers have been successfully demonstrated as technology which can improve in-cylinder combustion robustness. Past learnings of pre-chamber technologies, including studies of the effects of heat transfer and mixture stratification, have guided the size, shape, orientation, and number of pre-chambers.

The engine concept presented in this work is based on a new pre-chamber engine design where the spark electrodes are located in the pre-chamber and a direct injection (DI) fuel injector is located in the main chamber. Supplemental fueling (e.g. DI or port fuel injection (PFI)) is used to create the initial fuel/air charge in the main combustion chamber. To the best of our knowledge, this approach differs from any pre-chamber engine designs previously considered. The design was enabled by advances in numerical simulations, computational resources, fuel injection hardware, and manufacturing techniques. Specifically, the objective of the design process documented here was to develop a combustion system where lean fuel-to-air equivalence ratios are created in the main chamber while near stoichiometric equivalence ratios are created in the pre-chambers using the DI fuel injector.

With the passing of the Clean Air Act of 1970 and the subsequent establishment of the Environmental Protection Agency, engine technologies offering significantly reduced tailpipe emissions started gaining major attention. Notably, gasoline pre-chamber engine concepts offered a promising solution to decreasing mobile sources of air pollution by increasing fuel efficiency and by decreasing engine-out emissions. Pre-chamber engine concepts are not a new technology to the automotive industry. H. R. Ricardo's internal combustion engine, documented in 1918, is the earliest pre-chamber concept found in the literature. The pollution regulations of the 1970's brought renewed focus on the pre-chamber engine concept from research institutions and industry. Most of the pre-chamber engine concepts suffered from atypical induction designs that required complicated valvetrain arrangements; however, recent advances in numerical simulations and computational resources allowed gasoline pre-chamber engine concepts to be systematically considered in new configurations. The comprehensive review by Toulson et al. outlined the progress of pre-chamber initiated combustion systems throughout history and provided sound engineering and scientific foundations for new engine designs which leveraged the best features of pre-chambers. Attard et al. demonstrated an auxiliary-fueled turbulent jet ignition pre-chamber concept in a GM Ecotec engine platform capable of achieving 42% peak net indicated thermal efficiency without the need for a complicated valvetrain induction system. In comparison, the standard GM Ecotec engine platform achieved a peak net indicated thermal efficiency of 37.9% in stoichiometric spark ignition mode of operation.

The work presented in this application focused on designing a prototype pre-chamber engine that reduces system complexity by eliminating the need for an auxiliary fuel injector located in the pre-chamber. Instead, the pre-chambers were designed to be fueled using an injection event from a fuel injector centrally mounted in the main combustion chamber (i.e. a gasoline DI system). This design concept leverages the advanced capabilities of modern fuel injectors and targets overall fuel lean operation. The technical approach used CFD to evaluate non-reacting in-cylinder flows of fuel and air achieved through different engine geometries. The designs were evaluated using metrics defined in the study to assess the efficacy of the flow at achieving the desired equivalence ratios in the pre-chambers and the main chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3B is a perspective view of a lean burn cylinder assembly according to a second embodiment of the present teachings.

FIG. 9A is a perspective cross-sectional view of a cylinder head having a pair of pre-chambers and a centrally disposed injector according to some embodiments of the present teachings.

FIG. 9B is a side cross-sectional view of the cylinder head of FIG. 9A according to some embodiments of the present teachings.

FIG. 11 is a perspective view of a pre-chamber insert illustrating three connecting orifices and associated gasket.

FIG. 12 is an exploded perspective view illustrating a pre-chamber igniter assembly having a spark plug, a retaining nut assembly, gasket, and pre-chamber insert.

Corresponding reference numerals indicate corresponding parts throughout the several views of the drawings.

DETAILED DESCRIPTION

Figure 1:
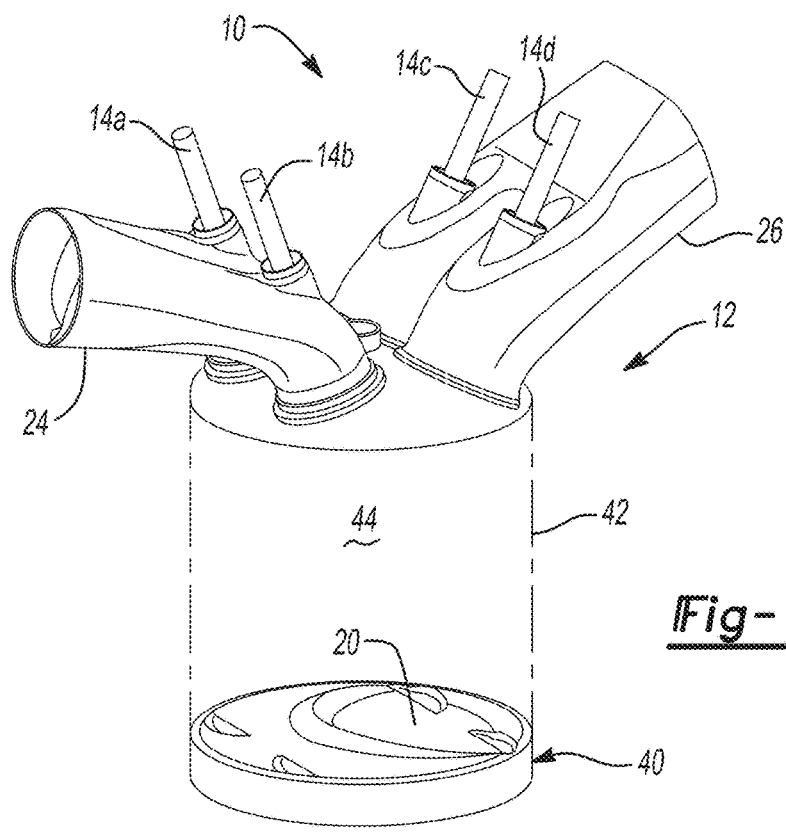
FIG. 1 shows a production base geometry (bottom dead center position) used as the starting point for the engine design process.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a novel combustion chamber geometry featuring dual pre-chambers for enhanced turbulent jet ignition is provided. A series of six design iterations are presented where the objective of the design process was to create ignitable mixtures within a pre-chamber (based on fuel-to-air equivalence ratio) through fuel injection profiles and flow control using the piston/cylinder head/pre-chamber geometry. The beneficial and disadvantageous features which guided the design progression are presented. Major combustion chamber design iterations involved changes to the pre-chambers position relative to the cylinder head deck plane, azimuthal orientation of the pre-chambers, and piston crown geometry. The modeling results indicate appropriate fueling strategies can be achieved which target specific fuel-to-air ratios in the pre-chambers.

The pre-chamber combustion system provides the ability to run a leaner A/F ratio, thereby improving efficiency by reducing pumping work and reducing burn duration. An added benefit is the ability to increase the compression ratio and burn lower octane fuels. Lean mixture combustion system has the potential to reduce Nox emissions.

Spark ignited internal combustion engine efficiency can be enhanced by operating in a lean region with a high air to fuel ratio. The system incorporates the lean burn combustion principle using head mounted pre-chambers. In some embodiments, two pre-chambers per cylinder are positioned vertically in the head keeping in line with the engine's centrally mounted DI fuel injectors. However, it should be understood that the present teachings are not limited to any particular number of pre-chambers. It has been found that systems employing a single pre-chamber provide suitable benefits, as do systems having a plurality of pre-chambers.

Accordingly, 5% to 10% combustion related improvement in fuel economy is realized over current stoichiometric combustion. Additional benefits afforded by lean burn, such as low pumping work and high compression ratio, further improve fuel economy, decrease burn duration, and improve the ability to burn lower octane fuels.

General Operating Methodology

Figure 9C:
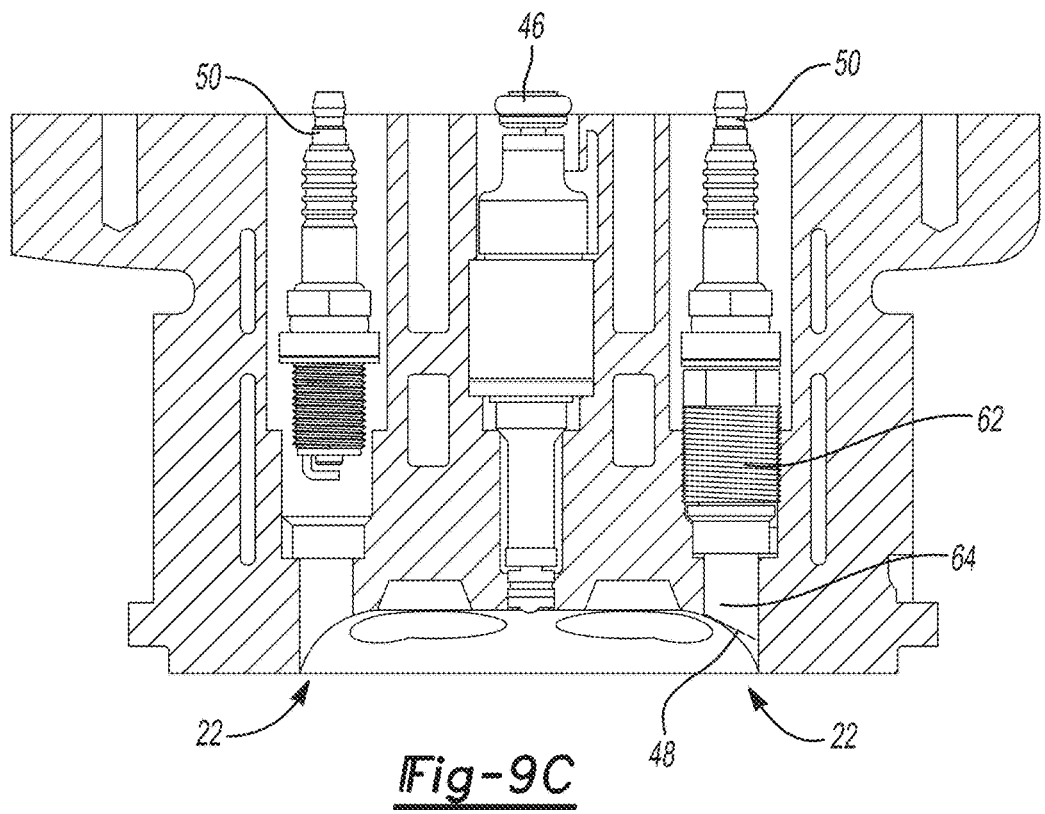
FIG. 9C is a front cross-sectional view of the cylinder head of FIG. 9A according to some embodiments of the present teachings.
Figure 10:
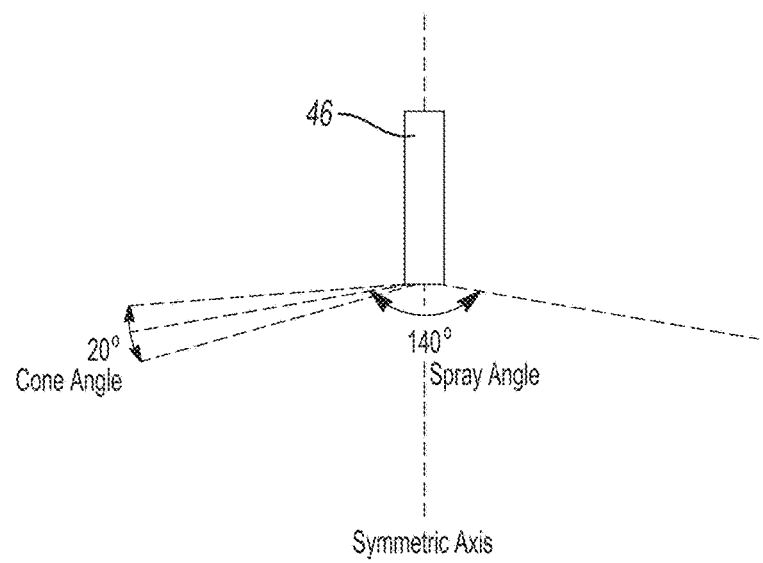
FIG. 10 is a schematic view of a spray pattern for the centrally disposed injector.
Figure 13:
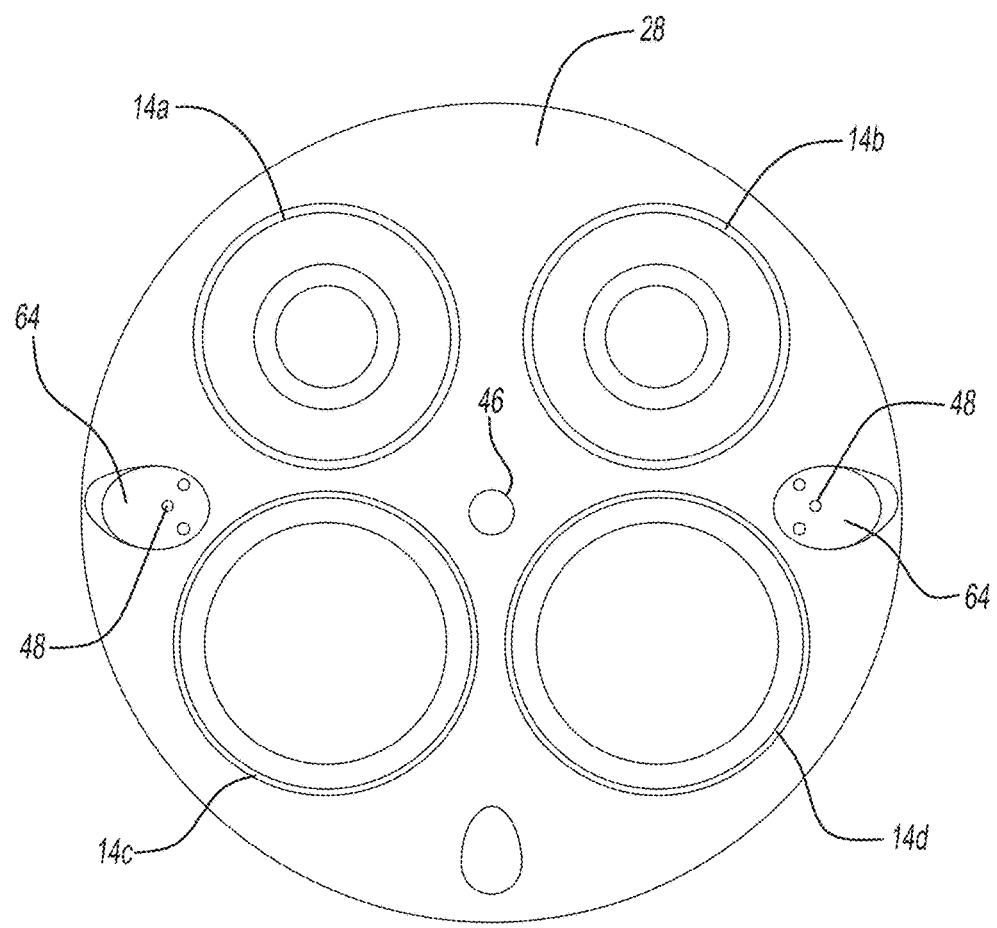
FIG. 13 is a bottom view of a cylinder head having intake valves, exhaust valves, a central injector, and a pair of pre-chamber igniter assemblies installed in diametrical arrangement.

As illustrated in the figures, in a pre-chamber combustion system 10, a piston 40 is disposed in a cylinder 42 for sliding movement therein similar to a conventional internal combustion system. However, the cylinder 42 further includes one or more pre-chambers 22 defining a volume set apart from but in fluid communication with the internal volume 44 of the cylinder 42 (i.e. the main combustion chamber 44). During an intake stroke, as the piston 40 travels from Top Dead Center (TDC) toward Bottom Dead Center (BDC), a first injection event occurs via a centrally mounted injector 46 (FIGS. 9C and 13) or other injection methodology (e.g. port fuel injection, direct injection). This first injection event provides the primary fuel/air mixture to the main combustion chamber 44. During a subsequent "compression" stroke, a second injection event occurs (also known as a booster injection) from injector 46. This second injection event targets a fuel jet or pulse towards the pre-chamber 22. The passive induction of this fuel/air charge into the pre-chamber 22 is dependent on many factors, such as, but not limited to, valve timing, valve angle, combustion chamber dome shape, piston crown shape, cylinder head port geometry, and the like. In some embodiments, the geometry of the piston crown 20 of piston 40 with flow directing walls provides a "bulk charge motion guided", "wall guided", or "spray-guided" motion causing the fuel-air charge to fill the pre-chamber 22 via the connecting orifices 48. It should be understood that any number of connecting orifices (e.g. one or more) can be used to fluidly couple the pre-chamber to the main chamber.

As the piston nears Top Dead Center (TDC) on the "compression" stroke, the fuel/air charge is compressed into the pre-chambers 22. At this stage the pre-chambers 22 are filled with fresh fuel-air charge ready for ignition in the next step. Before the piston 40 reaches or nears TDC, the pre-chamber spark plugs 50 are energized or otherwise actuated, thereby producing an ignition event. When the pre-chamber spark plugs 50 discharge, the fuel-air mixture in the pre-chambers 22 ignites, thereby providing high energy jets to the combustion chamber 44 via the connecting orifices 48. These high energy jets can have the form of un-reacted species, highly enthalpy flows, and/or ignition flames. These high energy jets are directed inward into the combustion chamber creating a strong primary activation energy source to the mixture in the combustion chamber. In some embodiments, these high energy jets are the primary flame kernel to the lean mixture in the combustion chamber—leading to a lean burn system. This results in a corresponding "power" stroke.

Computational Methodology

To determine an optimized design of the system (e.g. cylinder, pre-chamber, connecting orifices, and piston crown), commercial software CONVERGE™ (versions 2.1.0-2.2.0) was used. The software platform was selected based on the adaptive mesh refinement capabilities. Matlab R2014a -R2014b was used to post-process the output files and derive flow metrics. Ensight 10.1 was used to visualize the output data. Relevant boundary conditions and initial conditions were derived from a validated GT-Power (v7.4) engine model for all cases.

The flow field in the three-dimensional, moving boundary domain was modelled as compressible, viscous and non-reactive and used a k-ε turbulence model and temperature law-of-the-wall boundary conditions. The pressure solver first used a point-wise successive over-relaxation algorithm before using an efficient geometric multigrid procedure. A finite volume numerical discretization scheme was used to solve momentum, energy and species equations. Pressure-velocity coupling was accomplished using the pressure-implicit-with-splitting-of-operators method in conjunction with the Rhie-Chow interpolation scheme.

Iso-octane, i-$C_8H_{18}$, was used as the fuel and air was 23% oxygen (mass basis) and 77% nitrogen for all simulations. Dilution of the fuel/air charge with exhaust gas residual species was not considered in these studies. The spray rate profile was modeled as a square step function with a targeted peak injection pressure of 149±1 bar. The duration of the fuel injection event was varied to achieve the total mass of fuel desired. The fuel injector was represented as two identical nozzles 180° opposed in the azimuthal direction, each with a nozzle diameter of 150 μm, circular injection radius of 75 μm, and nozzle radial position of 1.5 mm.

The liquid fuel spray, injected at 335 K, was modeled using 50,000 parcels per injector based on a sensitivity study and best practices recommendations from the software manufacturer. The parcels were modeled as a bulk injection with the fuel droplet size distribution based on the nozzle size, and the parcels were distributed evenly throughout the spray cone. Kelvin-Helmholtz (KH) and Rayleigh-Taylor (RT) models were used to represent the primary spray breakup. The secondary spray breakup was modeled using child parcels and by examining the competing effects of the KH and RT breakup models. The specific model parameters used for the simulations are provided in the Supplementary Material and were based on the recommendations by CONVERGE for engine simulations of the type considered here. Further detail on the modeling parameters and theory can be found to in Senecal et al. and Richards et al.

The initial engine geometry for the new engine concept was based on a conventional inline four cylinder 2.0 L forced-induction gasoline production engine. The geometry of a single cylinder 12 of the base engine is presented in FIG. 1 having a four valves 14a, 14b, 14c, 14d, centrally-mounted spark plug 16, side-mounted direct injector 18, and a piston crown 20 designed to enhance mixing. The geometric specifications of the base engine and the final engine design (designated the Zeta prototype) are presented in Table 1.

TABLE 1

| Specification | Base Engine | Zeta Prototype |
|---|---|---|
| Bore | 86.0 mm | 86.0 mm |
| Stoke | 86.0 mm | 86.0 mm |
| Connecting Rod Length | 149.25 mm | 146.25 mm |
| Wrist Pin Offset | 0.8 mm | 0.8 mm |
| Compression Ratio | 9.5 | 10.25 |
| Intake Valve Diameter | 32.7 mm | 35.0 mm |
| Intake Valve Opening[a] | | 316 CAD |
| Intake Valve Closing[a] | | 582 CAD |
| Exhaust Valve Diameter | 26.0 mm | 29.0 mm |
| Exhaust Valve Opening[a] | | 164 CAD |
| Exhaust Valve Closing[a] | | 403 CAD |

[a]Valve events are specified at 1 mm lift

Initial intake and exhaust valve timings were taken from the production engine and modified to maximize volumetric efficiency within the constraints of the maximum allowable phasing of the production variable valve timing system. The intake valve phasing was ultimately limited by piston-valve interference, due to the geometry of the piston crown.

A total of 7 regions (defined by virtual boundaries in the simulation) were defined to develop flow metrics to evaluate the performance of the different engine designs. The boundaries, regions, associated initial conditions, and event timings are provided in the Supplementary Material. All calculations used initialization values for turbulent kinetic energy (TKE) of 1.0 $m^2/s^2$ and for TKE dissipation rate of 10 $m^2/s^3$. The computational mesh was a modified cut-cell Cartesian grid. The base cell size for the entire engine geometry mesh was set as a 4 mm cubic cell. Both fixed embedding and adaptive mesh refinement were utilized to locally refine the base mesh and create efficient and accurate grids at each time step. Portions of the main combustion chamber and the pre-chambers were further refined between 1 and 0.5 mm cubic cells. The volume defined by the projected bore area extended 17 mm past the cylinder head deck plane into the cylinder head and was populated with 1 mm cubic cells to ensure a smooth continuation of the flow from the port to the main combustion chamber. The remaining volume defined by the projected bore area into the cylinder head was populated with 2 mm cubic cells to help transition the flow from the base 4 mm cubic mesh found in the ports.

Figure 2:
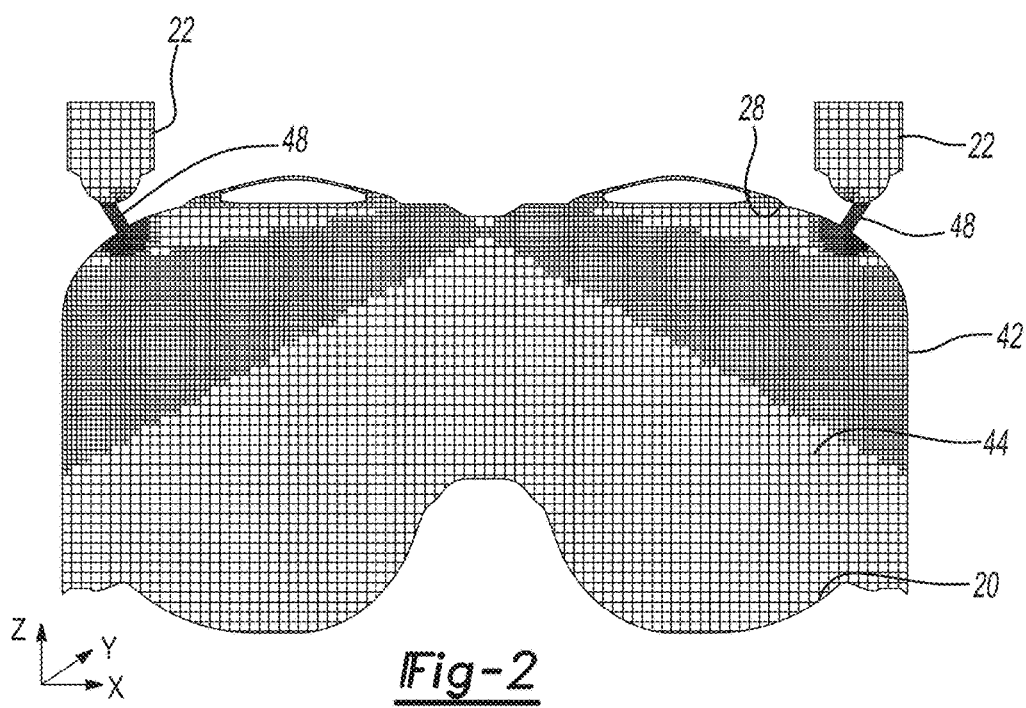
FIG. 2 is an example mesh highlighting the fixed cell embedding at the piston centerline for the final Zeta prototype just before the booster injection occurs at 60° bTDC.
Figure 3A:
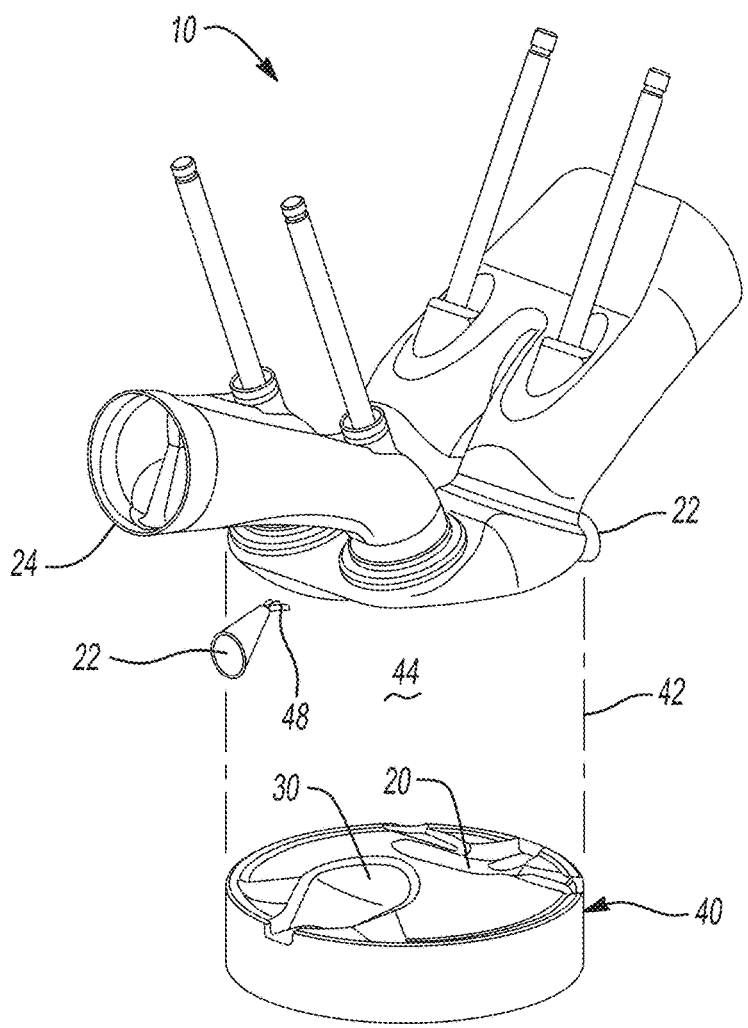
FIG. 3A is a perspective view of a lean burn cylinder assembly according to a first embodiment of the present teachings.
Figure 3A:
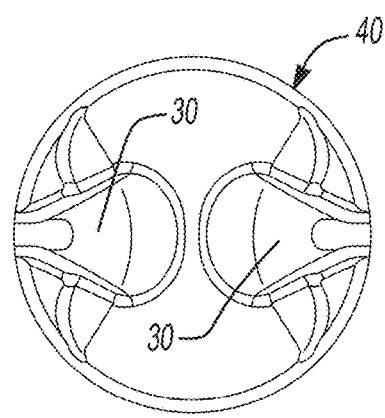
Figure 3C:
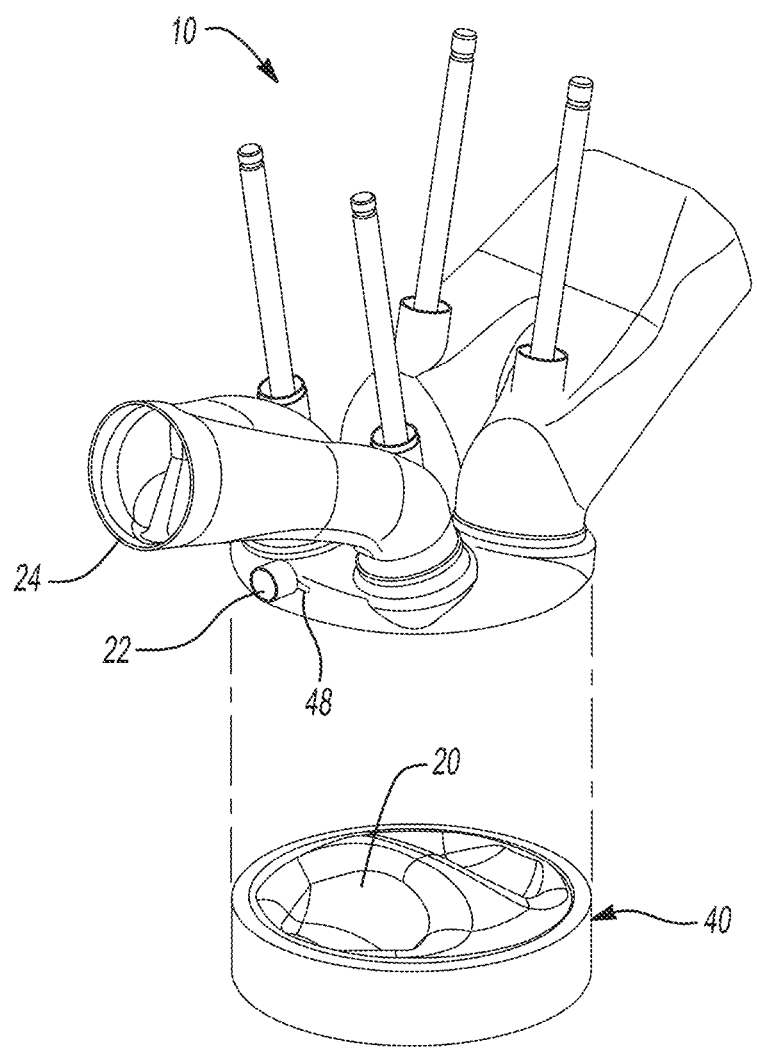
FIG. 3C is a perspective view of a lean burn cylinder assembly according to a third embodiment of the present teachings.
Figure 3C:
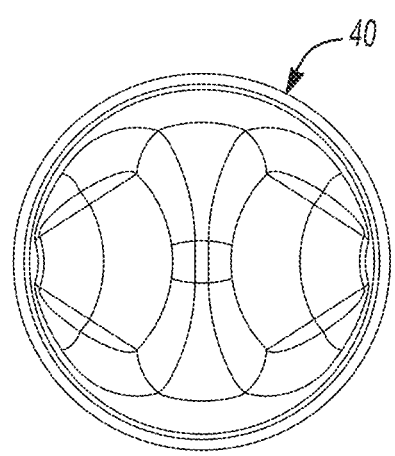
Figure 3D:
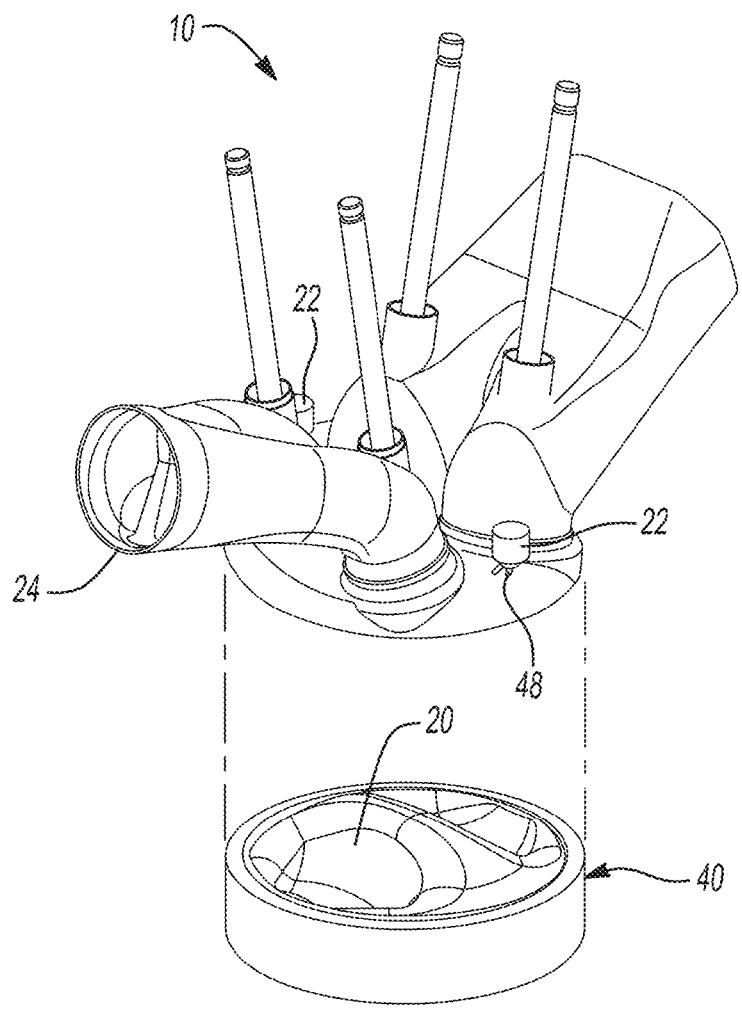
FIG. 3D is a perspective view of a lean burn cylinder assembly according to a fourth embodiment of the present teachings.
Figure 3D:
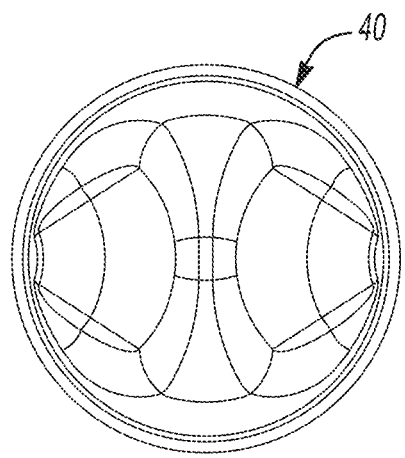
Figure 3E:
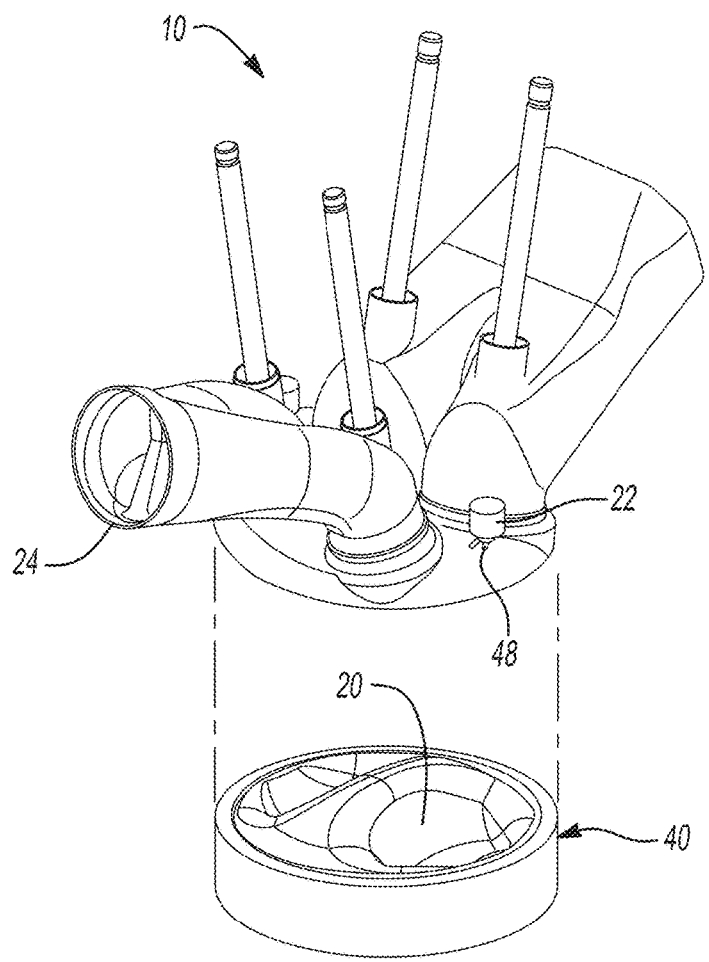
FIG. 3E is a perspective view of a lean burn cylinder assembly according to a fifth embodiment of the present teachings.
Figure 3E:
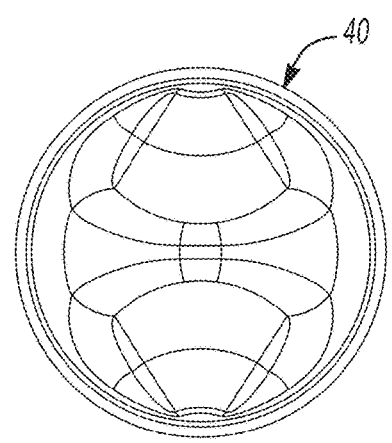
Figure 3F:
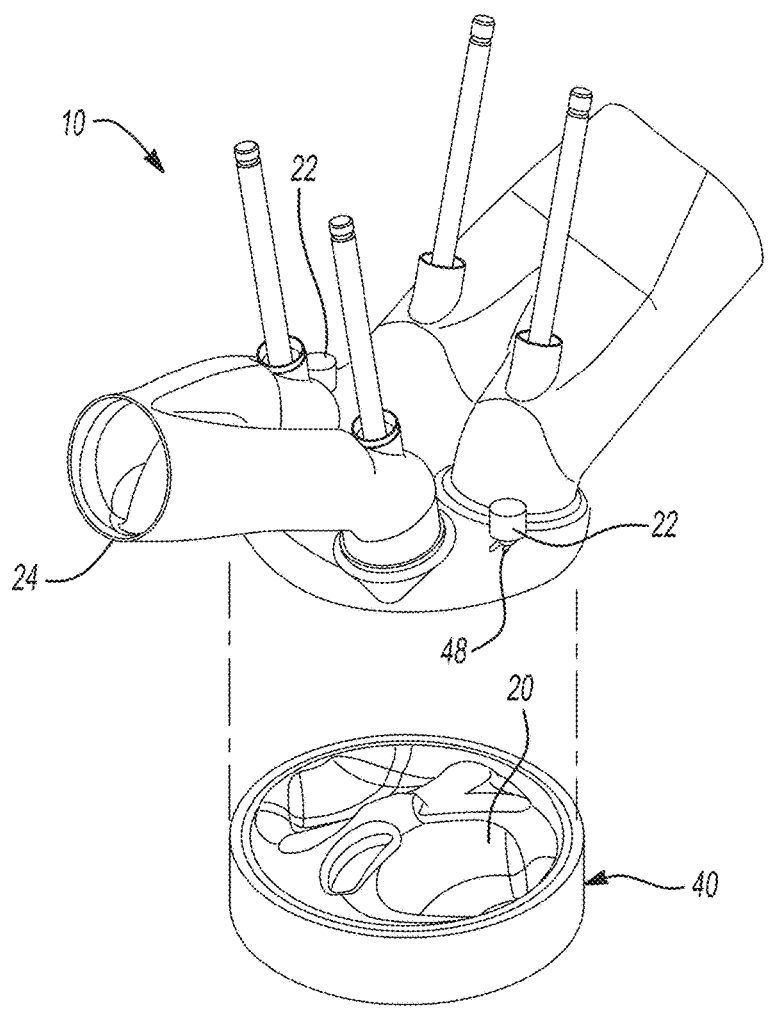
FIG. 3F is a perspective view of a lean burn cylinder assembly according to a sixth embodiment of the present teachings.
Figure 3F:
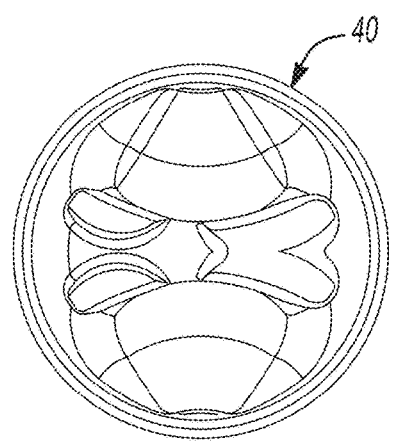

Two layers of 0.5 mm cubic cells were embedded off the intake and exhaust valve angle boundaries to ensure the flow past the valves was accurately captured during the valve opening and closing events. The volume surrounding and including the fuel spray was refined to 0.5 mm cubic cells to ensure the spray region was sufficiently resolved. FIG. 2 features a representative mesh of the final Zeta prototype just before an injection event is about to occur at 60° bTDC.

Velocity-based adaptive mesh refinement was used for the cylinder and intake system regions. A maximum allowable cell count of 1,000,000 cells could be achieved due to the adaptive mesh refinement. When the sub-grid velocity field exceeded 1.0 m/s, the affected cells and immediate neighbors were refined by reducing the cell size to 0.5 mm during the next time step. The total maximum cell count for the simulation results presented here was less than 990,000 cells, and the maximum cell count during the injection event was less than 725,000 cells. The cell counts were sufficient to obtain the desired sub-grid velocity field criterion of less than 1.0 m/s. The grid and refinement techniques are based on best practices recommendations to ensure a sufficiently resolved grid for gasoline, direct-injection, non-reacting simulations.

Prototype Development

The objective of the computational study was to identify an engine design which could create local fuel/air mixtures in the pre-chambers above the ignition and flammability limits (i.e. with fuel-to-air equivalence ratios at near stoichiometric values, φ~1.0), while maintaining lean conditions in the main combustion chamber. Rapid compression facility studies by Assanis et al. serve as a guidance for the flammability limits of lean and dilute iso-octane air mixtures in a combustion chamber. While spark plugs will be used to ignite the mixtures in the pre-chambers, spark plugs were not included in the simulations and all flow was non-reacting.

A series of six prototype iterations, visual representations provided in FIGS. 3A-3F, were considered to meet the project targets for fueling. The designs varied the in-cylinder flow, the placement of the pre-chambers, and the fueling strategy to meet the target equivalence ratios for the pre-chamber and the main combustion chamber. The naming convention was based on the generation of the design, e.g. Alpha, Beta, etc. ending with Zeta. A summary of the major design features for each iteration is presented in Table 2.

would not interfere with neighboring cylinders. Ease of manufacturing was also considered with the pre-chamber design.

The geometries of the piston crown 20, combustion chamber 44 dome, and the intake port were designed to create favorable charge motion so a combustible mixture

TABLE 2

| Prototype | Key Design/Revision Features | Conclusions |
|---|---|---|
| Alpha | Orifices located in linear parallel to cylinder head deck. Fuel spray was wall guided by the piston. | Low pre-chamber equivalence ratio ($\phi$~0.15) Poor pre-chamber fuel vapor fraction (~45% of the fuel mass in each pre-chamber) Substantial main chamber wall film (70% of the total fuel mass) Slight pre-chamber wall film (<5% of the total fuel mass) |
| Beta | Central orifices widened and angled upwards to align with injector spray cone centerline. Cut-out reliefs introduced in cylinder head dome to reduce wall wetting due to spray impingement. | Higher pre-chamber equivalence ratio ($\phi$~0.6) Poor pre-chamber vapor fraction (~45% of the fuel mass in each pre-chamber) Minimal main chamber wall film (<0.5% of the total fuel mass) Increased pre-chamber wall film (~23% of the fuel mass in each pre-chamber) |
| Gamma | Pre-chambers relocated to the cylinder head under ports Combustion chamber dome re-designed. Intake port re-designed for enhanced tumble. Fuel spray now air guided by charge motion. | Low pre-chamber equivalence ratio ($\phi$~0.1-0.2) Excellent pre-chamber vapor fraction (100% of the fuel mass in each pre-chamber) Slight main chamber wall film (<2% of the total fuel mass) Pre-chamber wall film eliminated |
| Delta | Pre-chambers rotated 90° azimuthally about central Z-axis. | Moderate pre-chamber equivalence ratio ($\phi$~0.3) Excellent pre-chamber vapor fraction (100% of the fuel mass in each pre-chamber) High main chamber wall film (<10% of the total fuel mass) Pre-chamber wall film eliminated |
| Epsilon | Piston rotated 90° azimuthally about central Z-axis. | Moderate pre-chamber equivalence ratio ($\phi$~0.3) Excellent pre-chamber vapor fraction (100% of the fuel mass in each pre-chamber) High main chamber wall film (<8% of the total fuel mass) Pre-chamber wall film eliminated |
| Zeta | New piston geometry with valve cut-outs for improved range of valvetrain phasing | Moderate pre-chamber equivalence ratio ($\phi$~0.3) Excellent pre-chamber vapor fraction (100% of the fuel mass in each pre-chamber) Main chamber wall film eliminated Pre-chamber wall film eliminated |

The pre-chambers 22 were designed to be indirectly fueled by a single injector 48 located in the main combustion chamber 44. One end of each pre-chamber 22 included the orifices 48 to connect the pre-chamber 22 to the main chamber 44. The number, size and orientation of the connecting orifices 48 affect the pre-chamber filling process and were considered variable design parameters in this study. In an effort to simplify the pre-chamber design, no poppet valve assembly or auxiliary fuel injectors (features previously demonstrated in the literature, see references therein) were located in the pre-chamber volume. Although spark plugs were not included in the simulation, packaging constraints of the pre-chambers were imposed to allow the pre-chamber spark plugs to be accessible for installation and maintenance. The pre-chambers were also located so they could be inducted into the pre-chambers by the time the piston reached the top dead center (TDC) position. The surface area to volume ratio of the pre-chamber geometry was selected to decrease heat transfer losses.

The production base engine geometry featured a centrally mounted spark-plug and a side-mounted injector. As noted earlier, the dual pre-chamber engine concept features a centrally mounted fuel injector in the main chamber with two opposed spray plumes targeted towards the pre-chambers. The central location of the fuel injector allowed for greater flexibility in creating a symmetric fuel spray pattern target flow to each of the pre-chambers.

The fueling amount used in the simulations was based on a typical engine operating condition of 2,000 RPM and 4 bar brake mean effective pressure (BMEP). This engine operating point required approximately 16 mg of fuel for typical SI operation. Since the dual pre-chamber engine concept targeted lean burn operation, the simulations considered 2 mg of fuel injected directly into the main combustion chamber by the direct injector. This fueling event is referred to as the booster injection, and is meant to create ignitable mixtures in the dual pre-chambers.

In addition to the booster fuel injection event targeted for fueling the pre-chambers, a global or first injection event would be required in the engine to create the overall fuel lean charge in the main combustion chamber. This global injection event could be provided by the DI or a PFI injector. The global injection event would occur before the booster DI event, providing a background or baseline level of fuel in the main chamber. The booster injection would occur after the global injection event, late in the intake stroke, and would introduce a small amount of fuel targeted to create the near stoichiometric conditions in the pre-chambers. For this study, the global injection event was not included in the simulations, as it was assumed the global injection event would create a consistent background level of fuel in the main chamber and pre-chambers. This represents the most challenging situation for the booster injection, when there is no pre-existing background level of fuel in the main chamber or pre-chambers.

Figure 4:
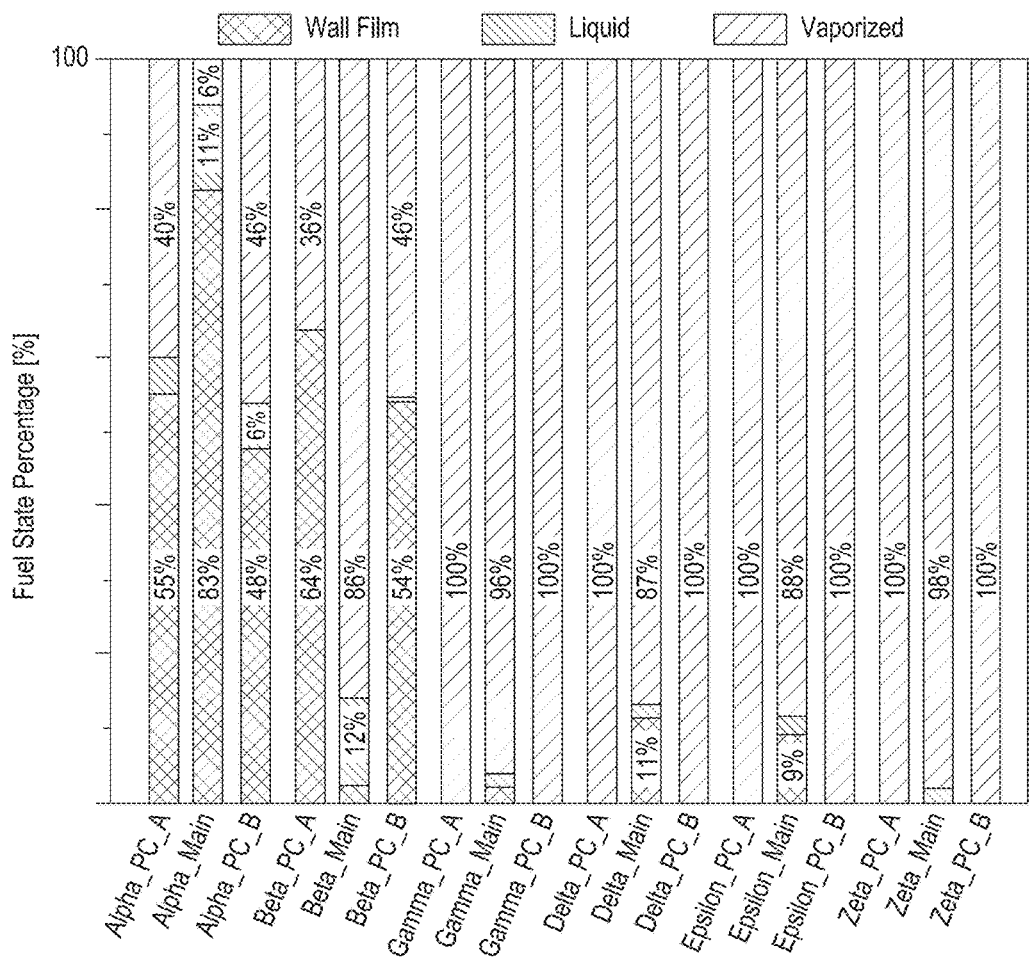
FIG. 4 is a graph summary of the fuel state (wall film, liquid, or vaporized) in the main chamber and pre-chambers by prototype iteration.

The major conclusions from the computational studies of the design prototypes are presented along with the major design features in Table 2. A key metric of prototype performance was the state of the fuel in the main chamber and pre-chambers. A summary of the fuel state from a booster injection event of 1 mg of fuel is presented by prototype iteration in FIG. 4. The physical changes outlined in Table 2 were made to achieve fully vaporized fuel in the pre-chambers; a design feature which was met by the Zeta prototype.

Brief summaries of the design features of the prototypes are provided here. The Alpha prototype modified the production base geometry while attempting to integrate the pre-chambers 22 as per the criteria described earlier. The intake port 26, exhaust port 24, and combustion chamber dome 28 were unchanged. The two, diametrically opposed, pre-chambers 22 were placed in the liner below the intake ports 26 and exhaust ports 24. The pre-chambers 22 were placed sufficiently below the cylinder head deck so the limiting dimension of the spark plug could clear the cylinder head gasket. Each conically shaped pre-chamber 22 was sized as 1% of the total combustion chamber volume and included three horizontal connecting orifices, each with a nominal diameter of 1.25 mm. The pre-chamber volume sizing and orifice diameters were in alignment with recommendations set forth by Gussak et al. The Alpha prototype piston crown 20 featured two scallops 30 pointing towards each pre-chamber 22. When the piston was in the TDC position, the pre-chamber connecting orifices remained unobstructed. The Alpha prototype aimed to induct the charge mixture into the pre-chamber by transferring the charge mixture from the squish region through the connecting orifices to the pre-chamber 22.

In some embodiments, as described herein, one or more pre-chambers can be operably coupled in communication with the main combustion chamber. In some embodiments, two or more pre-chambers are diametrically opposed within main combustion chamber. Each pre-chamber volume is connected to the main combustion chamber with one or more connecting orifices. In some embodiments, three connecting orifices are used to connect the pre-chamber volume to the main combustion chamber. The connecting orifices do not have to be in the same orientation and do not have to be the same size, orientation, or shape.

In some embodiments, each pre-chamber has a volume that is approximately 1% of the total combustion volume, but can be more or less than that. However, it should be understood that heat transfer losses start to play a big role once the volume is grossly exceeded, so typically each pre-chamber would not be bigger than 3-5% of the total combustion chamber volume. The volume shape is usually spherical in order to create the least surface area to volume ratio shape to decrease heat transfer losses, but it should be understood that alternative shapes are envisions, such as conical or complex shapes.

Each pre-chamber volume has one ignition source (such as a spark plug), typically, but not necessarily diametrically opposed of the connecting orifices.

A pre-chamber igniter assembly 60 can comprise the pre-chamber volume 22, connecting orifices 48 extending through a pre-chamber insert member 64, pre-chamber retaining nut 62, and spark plug 50. In some embodiments, the spark plug, pre-chamber, and spark plug retention nut are designed specifically for volume matching. The combined pre-chambers' volume is a set ratio of combustion chamber volume. The flexibility of the length of the spark plug retention nut allows for adjustable volume while maintaining pre-chamber bowl geometry.

These pre-chambers igniter assemblies are located in the cylinder head in the Zeta (latest) prototype and are modular and interchangeable to allow for testing different configurations and serviceability in production engines. Note the pre-chambers in certain earlier prototype version were located in the engine block/cylinder liner.

The pre-chamber inserts may feature a clocking feature to specify the alignment of the pre-chamber orifices with the main chamber.

One or more of the pre-chamber orifices can be oriented favorably in order to allow for maximum flame coverage/propagation and are not limited to being symmetric about the pre-chamber or cylinder bore. Asymmetric orifices can be used to encourage sufficient swirl. Orifices are oriented to reduce flame impingement on the piston crown surface.

The pre-chamber igniter assemblies do not feature a fuel injector or auxiliary valve to introduce additional fueling into the pre-chamber volume like most competing products or prior art. All air-fuel charge mixtures are inducted from the main chamber through the connecting orifices.

The pre-chamber orifices can be located and oriented such that a Venturi suction effect can be created across an orifice from the charge motion flow entering or exiting the combustion chamber. Thus a re-circulatory charge motion within the pre-chamber volume (one orifice brings mass in, the other suctions it) is created and can be used as a mechanism to purge the pre-chamber volume.

Prototype Discussion

For the Alpha prototype fueling strategy, two "pencil" sprays (i.e., with narrow spray cones), limited by the combustion chamber dome clearance, were aimed at a 125.5° included spray angle facing the narrow end of each scallop 30. One mg of fuel was injected at 149.5 bar rail pressure for a duration of 3.54 CAD. Spray patterns with included cone angles of 2.6° and 5° were simulated at the start of the injection (SOI) timings of 35° bTDC, 20° bTDC, and 5° bTDC. The most successful spray pattern, 5° cone angle and 20° bTDC SOI, resulted in only 6.6% of the total fuel vaporized in the two pre-chambers at TDC. In summary, the Alpha prototype with a 1 mg fuel injection was able to achieve $\phi=0.15$ and $\phi=0.13$ in pre-chamber A and B, respectively. The vaporized fuel fraction was 41% and 46% in pre-chambers A and B, respectively, with the remainder of the fuel fraction in the liquid phase in each pre-chamber.

Using the most successful Alpha prototype spray profile, the mass of fuel injected was increased to 10 mg while keeping all other variables constant. The amount of vaporized fuel in the pre-chambers at TDC was approximately the same as for the 1 mg fuel injection at 6.2%. When the speed of the engine was doubled to 4000 RPM while setting the fueling amount at 1 mg, the amount of vaporized fuel in the pre-chambers at TDC decreased slightly to 6.0%.

The Beta prototype improved on the Alpha prototype by angling the central connecting orifice upwards to better match the fuel spray angle. The included spray angle for the two fuel jets was increased to 142.5° to directly target the central connecting orifice. The fueling amount was increased to 2 mg at the same rail pressure. Spray patterns with included cone angles of 2.6° and 5° were simulated at SOI timings of 60° bTDC, 40° bTDC, and 20° bTDC. The most successful spray pattern using 2 mg of fuel, a 5° cone angle and a 40° bTDC SOI, yielded ~50% of the total fuel as vapor in the two pre-chambers at TDC.

The Beta prototype with a 2 mg injection was able to achieve $\phi=1.18$ (with a vaporized fuel fraction of 50%) and $\phi=1.24$ (with a vaporized fuel fraction of 51%) in pre-chamber A and B, respectively. While the pre-chambers inducted enough fuel to achieve the design target of nearly stoichiometric mixtures, there was significant concern about the amount of liquid fuel present at TDC in each pre-chamber. 36.3% of the total fuel was predicted to result in wall films in the pre-chambers, occurring mostly in the connecting central orifice. The Beta design also raised concerns that the central orifice could clog during engine operation from fuel film effects such as coking or varnishing. The high levels of wall films could also be a source of unburned hydrocarbon and particulate emissions. The Gamma prototype aimed to improve the amount of vaporized fuel in the pre-chambers while simultaneously reducing the amount of liquid fuel in the pre-chambers. The Gamma prototype avoided the use of the direct "pencil" type spray profile. Instead, the fuel spray was air-guided by rebounding the fuel off of a re-designed piston surface and into the pre-chambers which were re-located in the cylinder head. The approach allowed significantly longer mixing time, which increased vaporization of the fuel. To further enhance mixing and direct the fuel, the charge motion tumble was improved over the base production geometry by changing the intake valve angle and corresponding port design.

The new spray profile had the added benefit of eliminating the limitation of wetting the combustion chamber dome. So the included spray cone angle was increased to 20° to further assist fuel mixing. Sprays with included spray angles of 70°, 90°, and 140° were investigated at SOI of 40° bTDC. At 60° bTDC SOI, sprays with included spray angles of 40°, 80°, and 140° were evaluated. The velocity vector field was examined by creating various cut-planes along the cylinder. Comparing the velocity vectors of the cells along the two centerline cut-planes yielded interesting findings. The pre-chamber connecting orifices in the Gamma prototype were located in a region of significant recirculation. The charge mixture was circulated back towards the center of the combustion chamber instead of being inducted into the pre-chamber. Co-incidentally, 90° rotated in the azimuthal direction, the flow field was extremely favorable for re-locating the pre-chambers.

The Delta prototype featured the piston orientation of the Gamma prototype, but the pre-chambers were relocated 90° in the azimuthal direction in the cylinder head. The same parametric study of SOI and spray angle used to evaluate the Gamma prototype was applied to evaluate the Delta prototype. The highest amount of vaporized fuel in the two pre-chambers at TDC for the Delta prototype was associated with the 140° included spray angle and 60° bTDC SOI, and a 1 mg injection yielded $\phi=0.29$ and $\phi=0.30$ in pre-chambers A and B, respectively. The vaporized fuel fraction was 100% for both pre-chambers, a significant improvement over the Beta prototype.

The Epsilon prototype was identical to the Delta prototype, but the piston was rotated 90° in the azimuthal direction so the injection event could benefit from the proper orientation of the piston scallops. The intake and exhaust valve timings for the Epsilon prototype were identified using GT-Power to achieve the largest trapped air mass given the range of authority of the factory variable valve timing. The new piston orientation required the exhaust valve to be advanced by 10 CAD to prevent piston and valve interaction. The intake valve timing remained unchanged. The same parametric study of spray cone angle and SOI used for the Gamma and Delta designs was applied to the Epsilon prototype. The Epsilon prototype was able to induct a larger amount of charge mixture into the pre-chambers using the 20° and 40° included spray angles in comparison with the Delta prototype. These spray angles relied more significantly on the piston crown geometry to guide the charge mixture into the pre-chambers. The best fueling strategy for the Epsilon prototype occurred with the same SOI and same spray angle as the Delta prototype, and resulted in an approximately equal amount of charge mixture inducted in each pre-chamber. The tumble, caused by the valve angle and port geometry, was sufficiently intense that the tumble flow was the primary transport mechanism for the induction of the charge mixture into the pre-chambers at the included spray angle of 70°.

The Zeta prototype featured the same combustion chamber geometry as the Epsilon prototype, but the piston crown geometry was modified to avoid piston and valve interaction. A similar parametric study of spray cone angle, included spray angle, and SOI was conducted for the Zeta prototype. The spray pattern with the best results for the Zeta prototype was achieved with a 20° included spray cone angle and a 140° included spray angle. The results for the equivalence ratio at TDC in the pre-chambers and the main chamber for each of the prototype designs are compared in Table 3. The model predictions show the target goals of controlling the relative fuel quantities in the pre-chambers and the main chamber were met in the Delta, Epsilon and Zeta designs, and the Zeta design further achieved complete vaporization of the fuel in the pre-chamber with 98% vaporization in the main chamber.

Figure 5:
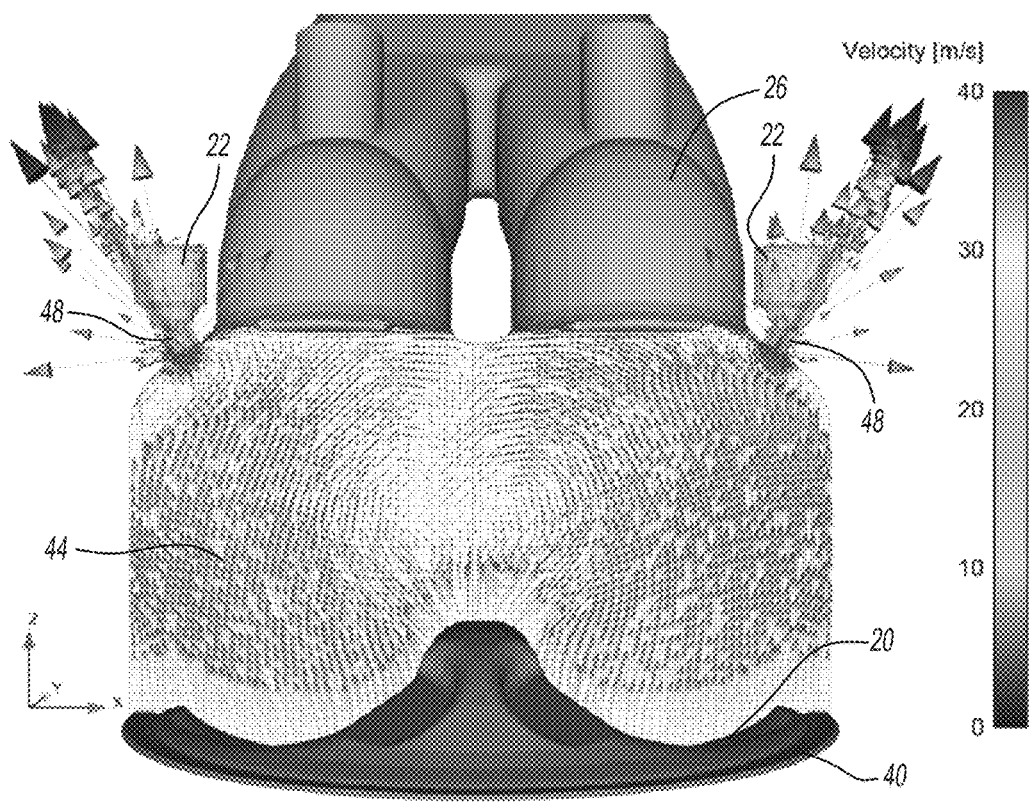
FIG. 5 shows the velocity vector field at the centerline cut plane of the Zeta prototype at 70° bTDC highlighting the split reverse tumble motion of the bulk flow field for 1 mg of fuel injected at SOI=60° bTDC.

The success of the Zeta prototype was due to the bulk charge motion developing a split reverse tumble motion. The intake port, combustion chamber dome, and piston geometry were designed to enable this motion. The fuel injected into the main chamber during the booster injection was successfully vaporized and transported towards and inducted into the pre-chambers. FIG. 5 shows the velocity vector field of the Zeta prototype 1 mg fuel injection simulation on the centerline cut plane at 60° bTDC.

TABLE 3

| Prototype | Start of Injection [°bTDC] | Main Chamber θ | Main Chamber Vapor Fraction | Pre-Chamber A θ | Pre-Chamber A Vapor Fraction | Pre-Chamber B θ | Pre-Chamber B Vapor Fraction |
|---|---|---|---|---|---|---|---|
| Alpha | 20° | 0.00 | 6% | 0.15 | 41% | 0.13 | 46% |
| Beta | 40° | 0.01 | 81% | 0.61 | 45% | 0.63 | 46% |
| Gamma | 60° | 0.04 | 96% | 0.09 | 100% | 0.19 | 100% |
| Delta | 60° | 0.04 | 87% | 0.29 | 100% | 0.30 | 100% |
| Epsilon | 60° | 0.04 | 88% | 0.29 | 100% | 0.28 | 100% |
| Zeta | 60° | 0.06 | 98% | 0.27 | 100% | 0.29 | 100% |

Figure 6:
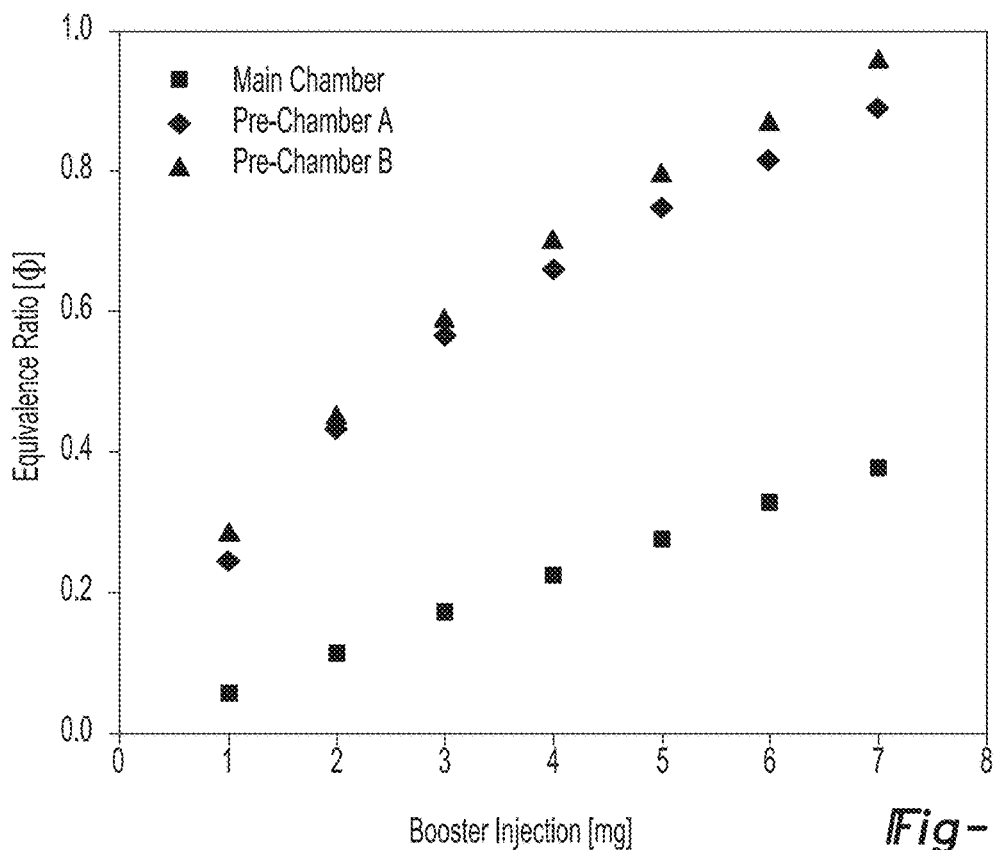
FIG. 6 shows equivalence ratio by region as a function of the fuel mass in the booster injection event for 20° included spray cone angle, 140° included spray angle, and SOI of 60° bTDC.

Based on the positive results for the Zeta model predictions for fuel distribution and phase, a larger parametric space for fuel mass was explored for the Zeta prototype using a 20° spray cone angle and a 140° included spray angle, with fueling amounts from 1 mg to 7 mg and SOIs of 50°, 60° and 70°. Table 4 summarizes the results for fuel mass by region. The SOI of 60° bTDC yielded the best results in terms of equivalence ratios of vaporized fuel in the pre-chambers and the main chamber. FIG. 6 presents the equivalence ratio in the pre-chambers and the main chamber for SOI of 60° bTDC as a function of the booster fuel mass injected. The pre-chambers achieved near stoichiometric mixtures of fully vaporized fuel with the 7 mg booster injection. The results also show the main chamber was fuel lean throughout the range of fuel mass considered.

FIG. 6 and Table 4 show the amount of fuel injected in the booster event can be lower than 7 mg and achieve $\phi > 0.8$ conditions in the pre-chambers. The results indicate when the booster fueling event is superimposed on the conditions created by a global fuel injection event, near stoichiometric conditions can be achieved in the pre-chambers.

The results of the computational simulations were also interrogated to understand the transient behavior of the flow into and out of the pre-chambers. Using the flow field near the pre-chamber orifices, a flow field alignment metric was developed with the form:

$$Vel_{ratio} = \frac{\hat{V}_{zone} \cdot \hat{n}_{orifice}}{|\hat{V}_{zone}|} \quad (1)$$

where $\hat{V}_{zone}$ is is the average velocity vector in a spherical region outside the pre-chamber orifices and in the main chamber, and $\hat{n}_{orifice}$ is the vector normal to the planar area of the opening of each orifice, with the positive direction chosen as towards the pre-chamber. The dot product of $\hat{V}_{zone}$ and $\hat{n}_{orifice}$ gives an absolute measure of how well the flow field is aligned with the orifice orientation.

TABLE 4

| Fueling Amount | Start of Injection [°bTDC] | Main Chamber θ | Main Chamber Vapor Fraction | Pre-Chamber A θ | Pre-Chamber A Vapor Fraction | Pre-Chamber B θ | Pre-Chamber B Vapor Fraction |
|---|---|---|---|---|---|---|---|
| 1 mg | 60° | 0.06 | 98% | 0.28 | 100% | 0.27 | 100% |
| 2 mg | 60° | 0.11 | 98% | 0.48 | 100% | 0.47 | 100% |
| 3 mg | 50° | 0.17 | 95% | 0.52 | 100% | 0.52 | 100% |
| 3 mg | 60° | 0.17 | 97% | 0.62 | 100% | 0.62 | 100% |
| 3 mg | 70° | 0.17 | 98% | 0.61 | 100% | 0.59 | 100% |
| 4 mg | 50° | 0.22 | 94% | 0.61 | 100% | 0.60 | 100% |
| 4 mg | 60° | 0.22 | 95% | 0.74 | 100% | 0.74 | 100% |
| 4 mg | 70° | 0.23 | 98% | 0.72 | 100% | 0.71 | 100% |
| 5 mg | 60° | 0.28 | 93% | 0.78 | 100% | 0.83 | 100% |
| 6 mg | 60° | 0.33 | 91% | 0.90 | 100% | 0.91 | 100% |
| 7 mg | 60° | 0.38 | 90% | 0.97 | 100% | 0.97 | 100% |

Normalizing $Vel_{ratio}$ by the magnitude of $\hat{v}_{zone}$ enables direct comparison between different flow conditions and engine designs. In this form, $Vel_{ratio}$ quantifies the contribution of the local flow to filling and emptying the pre-chamber, where $Vel_{ratio}$ can have a value between −1 and 1. A $Vel_{ratio}$ value of 0 indicates the local flow is bypassing the connecting orifice. A $Vel_{ratio}$ value of +1 indicates the local flow is perfectly aligned and filling the pre-chamber. A $Vel_{ratio}$ value of −1 indicates the flow is perfectly aligned and emptying the pre-chamber.

Figure 7:
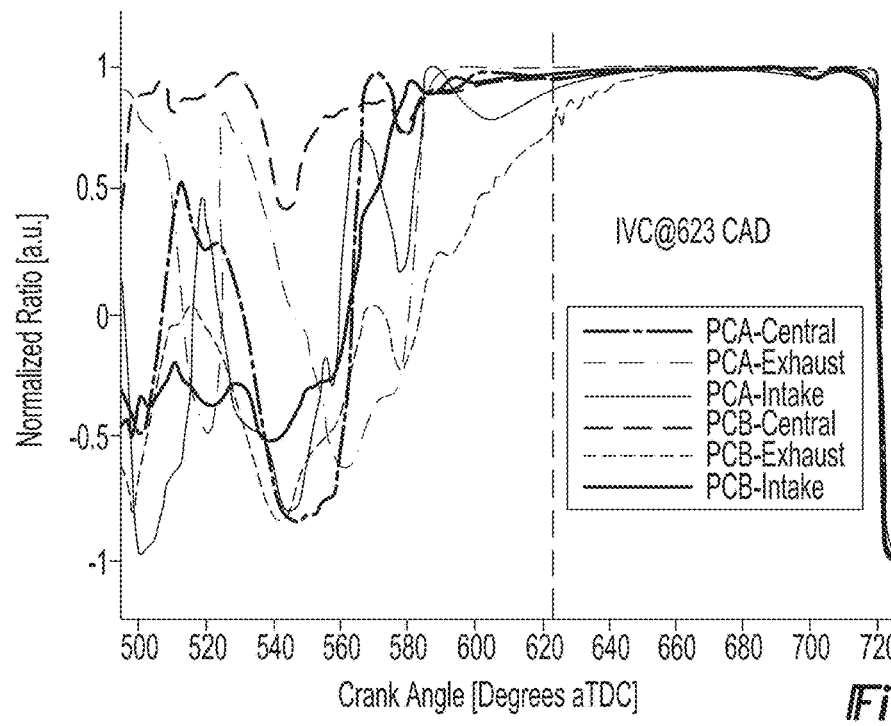
FIG. 7 shows $Vel_{ratio}$ for the pre-chamber orifices of the Beta prototype for a non-spraying simulation.
Figure 8:
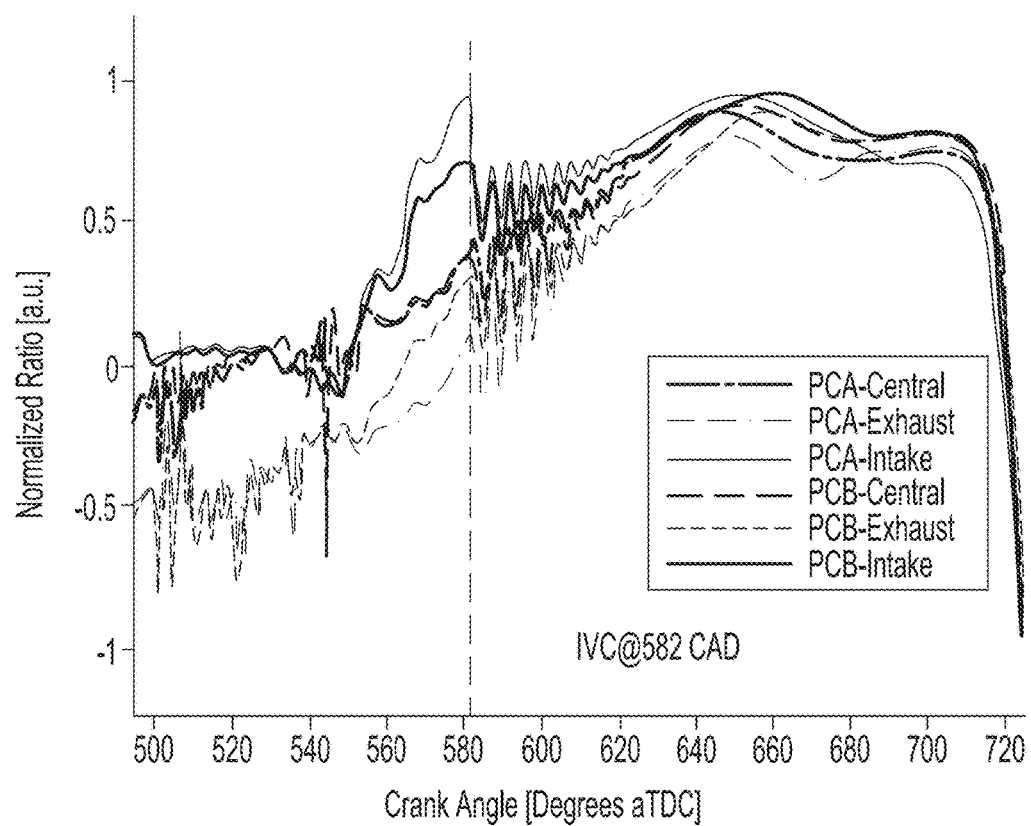
FIG. 8 shows $Vel_{ratio}$ for the pre-chamber orifices of the Zeta prototype for a non-spraying simulation.

FIGS. 7 and 8 present the results for $Vel_{ratio}$ for the Beta and Zeta prototypes, respectively. The Beta and Zeta simulations were selected to highlight key features of the transient flow behavior. In the figures, the time histories for $Vel_{ratio}$ for each of the six orifices are presented. The three orifices for each of the two pre-chambers are designated by their location relative to the exhaust valves, intake valves, and the central position.

Both prototype engine designs showed the full range of potential values for $Vel_{ratio}$ from −1 to +1. When the piston changed directions, either at BDC (540 CAD) or TDC (720 CAD), the $Vel_{ratio}$ captured the expected change in flow direction. Both engine designs showed the pre-chambers should be well-purged during the expansion stroke. The Beta prototype had an intake valve closing event, IVC, at 623 CAD, while the Zeta prototype had an intake valve closing event at 582 CAD. Both engine designs showed flow sensitivity immediately following IVC; however, the Zeta flow was more sensitive, with larger oscillations in $Vel_{ratio}$ over a longer portion of the cycle. The lower sensitivity of the Beta design was due to the local flow being "saturated" in the alignment with the orifices, with $Vel_{ratio} \cong 1$, for a majority of the time between IVC and TDC. Recall the Beta design targeted direct filling of the pre-chambers by the booster fuel spray, and the direct alignment of the liquid fuel spray led to unacceptably high liquid films in the pre-chamber.

When comparing the values for $Vel_{ratio}$ for the different orifices for the Zeta predictions in FIG. 7, there is a period of time before the intake valve closes (~560 CAD to 580 CAD) where the orifices on the exhaust side of the chamber had flow exiting the pre-chambers while flow through the other orifices were filling the pre-chambers. This may lead to short-circuiting of the flow, and this type of behavior can be a constraint on the timing of the booster fuel injection event. However, this type of behavior can also be desirable for purging the residuals from the pre-chambers depending on the timing. Similar simultaneous inflow and outflow behavior, although more erratic, was observed for the Beta model predictions before IVC. Note the decaying oscillations observed after IVC in the Zeta prototype results are likely due to the rapid numerical separation of the intake port and the combustion chamber and are likely an artifact of the solver. All convergence criteria are satisfied through this portion of the cycle. Soon after IVC, all orifices exhibited filling behavior for the Zeta model predictions (and the Beta model predictions). This portion of the cycle is when the booster fuel injection event occurred. A significant window of time when the flow is well-aligned with filling the pre-chambers is critical during this portion of the cycle to enable flexibility in the timing of the booster fuel injection event.

The intake and exhaust orifices for each pre-chamber were at significantly different angles for the Zeta prototype, yet FIG. 8 shows the $Vel_{ratio}$ values were comparable to the values for the central orifice. In other words, the flow alignment metric results for the Zeta prototype indicate little sensitivity of the flow to the angle of the pre-chamber orifices. This allows flexibility in strategically targeting the exhaust orifices of each pre-chamber to enable the shortest and most complete main chamber burn possible.

This work documented the development and evaluation of a new engine concept using computational simulations of non-reacting flow. The objective of the computational study was to evaluate the feasibility of several engine design configurations combined with fuel injection strategies to create local fuel/air mixtures in the pre-chambers above the ignition and flammability limits, while maintaining lean conditions in the main combustion chamber.

Through a series of six design iterations, the Zeta prototype was able to achieve the desired ignitable mixture in the pre-chamber at TDC by using an appropriate fuel injection profile and flow control via the piston, cylinder head, and pre-chamber geometry. The ignitable mixture was achieved using an injection strategy of 7 mg of fuel at 60° bTDC SOI with a spray pattern featuring a 20° included spray cone angle and a 140° included spray angle. Each pre-chamber was able to achieve $\phi=0.97$, which was near the nominal design target, while maintain a sufficiently lean global equivalence ratio of $\phi=0.38$ in the main chamber. The fuel was fully vaporized in the pre-chambers and was 90% vaporized in the main chamber. This was achieved by the two, diametrically opposed, pre-chambers being indirectly fueled from a centrally mounted fuel injector in the main chamber and using the bulk charge motion to improve fuel spray mixing. The results of this design study show difficulties associated with pre-chamber charge preparation of indirectly fueled pre-chamber engine designs can be overcome.

Additionally, a flow field alignment metric was developed based on the flow field near the pre-chamber orifices. The metric quantified the contribution of the local flow to the filling and emptying of the pre-chamber and aided in understanding of the transient nature of the pre-chamber filling dynamics. Regardless of combustion chamber geometry, number of orifices, or pre-chamber location, the optimal injection strategy will be one that introduces the appropriate amount of vaporized fuel near the pre-chamber orifices at a span of time where the near orifice flow field is at the highest alignment with the normal vector of the orifice opening.

Current work focuses on building, characterizing and testing of the Zeta prototype via an optically accessible single cylinder engine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine comprising:
a piston chamber;
a piston slidably disposed in the piston chamber, the piston having a piston crown along a top surface;
a head assembly having at least a pair of pre-chambers separate from the piston chamber and each in fluid communication with the piston chamber via at least one connecting orifice, the at least a pair of pre-chambers are diametrically opposed to each other relative to the piston chamber, said head assembly having an intake port and an exhaust port;
a fuel injector centrally mounted to the head assembly relative to the piston chamber, the fuel injector configured to inject fuel during an intake stroke of the piston and again during a compression stroke of the piston; and
an ignition device disposed in each of the at least a pair of pre-chambers for igniting a fuel air mixture within each of the at least a pair of pre-chambers, thereby producing an ignition jet being introduced into the piston chamber via the at least one connecting orifice of each of the at least a pair of pre-chambers to ignite a fuel/air mixture in the piston chamber,
wherein a fuel/air mixture is passively introduced into the at least a pair of pre-chambers during at least the intake stroke and the compression stroke of the piston and purged from the at least a pair of pre-chambers during an expansion stroke of the piston.

2. The internal combustion engine according to claim 1 wherein the fuel/air mixture that is passively introduced into the at least a pair of pre-chambers is passively wall-guided into the at least a pair of pre-chambers.

3. The internal combustion engine according to claim 2 wherein at least the piston chamber and the piston crown are complementarily shaped to facilitate the passive wall-guided introduction of the fuel/air mixture into the at least a pair of pre-chambers.

4. The internal combustion engine according to claim 1 wherein the fuel/air mixture that is passively introduced into the pre-chamber is passively flow-guided into the at least a pair of pre-chambers.

5. The internal combustion engine according to claim 4 wherein at least the piston chamber and the piston crown are complementarily shaped to facilitate the passive flow-guided introduction of the fuel/air mixture into the at least a pair of pre-chambers.

6. The internal combustion engine according to claim 1 wherein a fuel/air mixture within the at least a pair of pre-chambers is different that a fuel/air mixture within the piston chamber.

7. The internal combustion engine according to claim 6 wherein the fuel/air mixture within the at least a pair of pre-chambers is about stoichiometric and the fuel/air mixture within the piston chamber is leaner than stoichiometric.

8. The internal combustion engine according to claim 1 further comprising a pre-chamber igniter assembly operably coupled to each of the at least a pair of pre-chambers, the pre-chamber igniter assembly having the ignition device, a retaining nut assembly, and a pre-chamber insert, the pre-chamber insert having the at least one connecting orifice extending therethrough.

9. The internal combustion engine according to claim 8 wherein at least one of the pre-chamber igniter assembly is replaceable to permit modification of the operation of the pre-chamber igniter assembly.

10. An internal combustion engine comprising:
a piston chamber;
a piston slidably disposed in the piston chamber, the piston having a piston crown along a top surface;
a head assembly having at least two diametrically-opposed pre-chambers separate from the piston chamber and in fluid communication with the piston chamber via at least one connecting orifice, said head assembly having an intake port and an exhaust port;
a fuel injector centrally mounted to the head assembly relative to the piston chamber, the fuel injector configured to inject fuel at least twice during a single combustion cycle; and
an ignition device disposed in each of the at least two pre-chambers for igniting a fuel air mixture within the pre-chamber, thereby producing an ignition jet being introduced into the piston chamber via the at least one connecting orifice to ignite a fuel/air mixture in the piston chamber,
wherein at least the piston crown is shaped to passively introduced a fuel/air mixture into the at least two pre-chambers during at least a compression stroke of the piston and purged the mixture from the at least two pre-chambers during an expansion stroke of the piston.

11. The internal combustion engine according to claim 10 wherein the fuel/air mixture that is passively introduced into the at least two pre-chambers is passively wall-guided into the at least two pre-chambers.

12. The internal combustion engine according to claim 11 wherein at least the piston chamber and the piston crown are complementarily shaped to facilitate the passive wall-guided introduction of the fuel/air mixture into the at least two pre-chambers.

13. The internal combustion engine according to claim 10 wherein the fuel/air mixture that is passively introduced into the at least two pre-chambers is passively flow-guided into the at least two pre-chambers.

14. The internal combustion engine according to claim 13 wherein at least the piston chamber and the piston crown are complementarily shaped to facilitate the passive flow-guided introduction of the fuel/air mixture into the at least two pre-chambers.

15. The internal combustion engine according to claim 10 wherein a fuel/air mixture within the at least two pre-chambers is different that a fuel/air mixture within the piston chamber.

16. The internal combustion engine according to claim 15 wherein the fuel/air mixture within the at least two pre-chamber is about stoichiometric and the fuel/air mixture within the piston chamber is leaner than stoichiometric.

17. The internal combustion engine according to claim 10 further comprising a pre-chamber igniter assembly operably coupled to each of the at least two pre-chambers, the pre-chamber igniter assembly having the ignition device, a retaining nut assembly, and a pre-chamber insert, the pre-chamber insert having the at least one connecting orifice extending therethrough.

18. The internal combustion engine according to claim 17 wherein at least one of the pre-chamber igniter assembly is replaceable to permit modification of the operation of the pre-chamber igniter assembly.

* * * * *